US011162039B1

(12) United States Patent
Koseoglu et al.

(10) Patent No.: US 11,162,039 B1
(45) Date of Patent: Nov. 2, 2021

(54) SYSTEMS AND PROCESSES INTEGRATING HYDROPROCESSING AND AN AROMATICS RECOVERY COMPLEX FOR SEPARATING AND UPGRADING HYDROCARBONS

(71) Applicant: Saudi Arabian Oil Company, Dhahran (SA)

(72) Inventors: Omer Refa Koseoglu, Dhahran (SA); Robert Peter Hodgkins, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/891,273

(22) Filed: Jun. 3, 2020

(51) Int. Cl.
| *C10G 69/10* | (2006.01) |
| *B01J 8/26* | (2006.01) |
| *B01J 8/22* | (2006.01) |
| *B01D 3/10* | (2006.01) |
| *B01D 3/14* | (2006.01) |

(52) U.S. Cl.
CPC ............ *C10G 69/10* (2013.01); *B01D 3/10* (2013.01); *B01D 3/143* (2013.01); *B01J 8/22* (2013.01); *B01J 8/26* (2013.01); *C10G 2300/107* (2013.01); *C10G 2300/1077* (2013.01); *C10G 2300/202* (2013.01); *C10G 2300/205* (2013.01); *C10G 2300/206* (2013.01); *C10G 2300/208* (2013.01); *C10G 2300/301* (2013.01); *C10G 2300/308* (2013.01); *C10G 2400/04* (2013.01)

(58) Field of Classification Search
CPC .................................. B01J 8/26; B01D 3/143
USPC ...... 585/804, 802, 488, 483; 208/60, 70, 80, 208/85, 92, 107, 143, 177; 422/600, 608; 196/46
See application file for complete search history.

(56) References Cited

U.S. PATENT DOCUMENTS

| 2,987,465 | A | | 6/1961 | Johanson | |
| 3,197,288 | A | | 7/1965 | Johanson | |
| 4,053,388 | A | * | 10/1977 | Bailey | C07C 15/08 208/89 |
| 9,109,169 | B2 | * | 8/2015 | Al-Therwi | C10G 59/00 |
| 9,862,898 | B2 | * | 1/2018 | Ward | C10G 11/18 |
| 9,920,263 | B2 | * | 3/2018 | Klein | C10G 55/04 |
| 10,513,664 | B1 | * | 12/2019 | Koseoglu | C10G 65/18 |

(Continued)

OTHER PUBLICATIONS

International Search Report and Written Opinion dated Feb. 15, 2021 pertaining to International application No. PCT/US2020/057692 filed Oct. 28, 2020, 13 pgs.

*Primary Examiner* — Nina Bhat
(74) *Attorney, Agent, or Firm* — Dinsmore & Shohl LLP

(57) ABSTRACT

A process for separating and upgrading a hydrocarbon feed includes passing the hydrocarbon feed to a distillation unit to separate it into at least a naphtha stream and a residue, passing the naphtha stream to a NHT that hydrotreats the naphtha stream to produce a hydrotreated naphtha, passing the hydrotreated naphtha to a NREF that reforms the hydrotreated naphtha to produce a reformate, passing the reformate to an ARC that processes the reformate to produce at least one aromatic product effluent and an aromatic bottoms stream, passing at least a portion of the residue to a residue hydroprocessing unit that hydroprocesses the portion of the residue to produce a hydroprocessed effluent, and passing a portion of the aromatic bottoms stream to the residue hydroprocessing unit to increase the solubility of the asphaltene compounds and reduce sedimentation. Systems for conducting the process are also disclosed.

20 Claims, 8 Drawing Sheets

(56) References Cited

U.S. PATENT DOCUMENTS

| | | | |
|---|---|---|---|
| 10,760,012 B2 * | 9/2020 | Al-Ghamdi | C10G 67/00 |
| 10,870,807 B2 * | 12/2020 | Al-Ghamdi | C10G 11/02 |
| 10,934,495 B2 * | 3/2021 | Koseoglu | C10G 69/08 |
| 10,961,470 B1 * | 3/2021 | Koseoglu | C10G 67/02 |
| 11,046,898 B1 * | 6/2021 | Koseoglu | C10G 35/04 |
| 11,046,899 B2 * | 6/2021 | Hodgkins | C10G 65/12 |
| 2016/0369188 A1 * | 12/2016 | Housmans | C10G 67/0445 |
| 2018/0066197 A1 * | 3/2018 | Koseoglu | C10G 69/00 |
| 2019/0010411 A1 | 1/2019 | Koseoglu et al. | |
| 2020/0115642 A1 | 4/2020 | Al-Ghamdi et al. | |

* cited by examiner

SYSTEMS AND PROCESSES INTEGRATING HYDROPROCESSING AND AN AROMATICS RECOVERY COMPLEX FOR SEPARATING AND UPGRADING HYDROCARBONS

BACKGROUND

Field

The present disclosure relates to systems and processes for separating and upgrading petroleum-based hydrocarbons, in particular, systems and processes integrating hydroprocessing and an aromatics recovery complex to separate and upgrade hydrocarbons, such as crude oil.

Technical Background

Petrochemical feeds, such as crude oils, can be converted to fuel blending components and chemical products and intermediates such as olefins and aromatic compounds, which are basic intermediates for a large portion of the petrochemical industry. Crude oil is conventionally processed by distillation followed by various cracking, solvent treatment, and hydroconversion processes to produce a desired slate of fuels, lubricating oil products, chemicals, chemical feedstocks and the like. An example of a conventional refinery process includes distillation of crude oil by atmospheric distillation to recover gas oil, naphtha, gaseous products, and an atmospheric residue. Streams recovered from crude oil distillation at the boiling point of fuels customarily have been further processed to remove sulfur and other contaminants and upgraded to produce various fuel blending components.

Catalytic reformers are the workhorses of refineries to upgrade various distillate streams from atmospheric distillation to produce reformate, which is an aromatic rich gasoline blending fraction or feedstock for aromatics production, such as production of benzene, toluene, and xylenes (BTX). Due to stringent fuel specifications implemented or being implemented worldwide, requiring less than 35 V % aromatics and less than 1 V % benzene in gasoline, the reformate fraction is further treated to reduce its aromatics content. The treatment options available are benzene hydrogenation and aromatics (BTX) recovery. In the first option, reformate is hydrogenated to reduce the benzene content and the total aromatics content is reduced by blending if needed. In the latter option, reformate is passed to an aromatic recovery complex (ARC) to recover the aromatics such as benzene, toluene, and xylenes (BTX), which have premium chemical value. The ARC may also produce a gasoline blending component that is free of benzene and other aromatic compounds. The ARC produces a reject stream or aromatic bottoms that is very heavy (boiling in the range of from 150 degrees Celsius (° C.) to 450° C.) and is not suitable as a gasoline blending component.

Atmospheric distillation of crude oil produces an atmospheric residue, which can be further upgraded. The atmospheric residue can be fractionated in a vacuum distillation unit to produce a vacuum gas oil and a vacuum residue. The vacuum gas oil can be cracked to provide more valuable light transportation fuel products in a fluid catalytic cracking unit or by hydrocracking. The vacuum residue can be further treated for conversion to more valuable products. Vacuum residue upgrading processes can include one or more of residue hydroprocessing, residue fluid catalytic cracking, coking, and solvent deasphalting.

Atmospheric residues and vacuum residues can be upgraded through hydroprocessing to increase the yields of valuable products and intermediates from refinery operations. During hydroprocessing, a hydrocarbon feed is reacted with hydrogen in the presence of one or more hydroprocessing catalysts to produce an upgraded effluent. There are generally four common reactor types used in the refining industry for hydroprocessing hydrocarbon streams: fixed-bed reactors, ebullated-bed reactors, moving-bed reactors, and slurry-bed reactors. The decision to use a particular type of reactor is based on a number of criteria including the type of feedstock, desired conversion percentage, flexibility, run length, and product quality, among others. In a refinery, the down-time for replacement or renewal of a catalyst must be as short as possible. Further, the economics of the process will generally depend upon the versatility of the system to handle feed streams containing varying amounts of contaminants such as sulfur, nitrogen, metals, or organometallic compounds, such as those found in vacuum gas oil, deasphalted oil, and residues (atmospheric residue or vacuum residue).

In a fixed-bed reactor, catalyst particles are stationary and do not move with respect to a fixed reference frame. Fixed-bed technologies have considerable problems in treating particularly heavy feedstocks containing relatively high quantities of heteroatoms, metals, and asphaltenes, as these contaminants can cause the rapid deactivation of the catalyst and plugging of the reactor. In conventional fixed-bed reactors, the hydroprocessing catalysts are replaced regularly in order to maintain the desired level of catalyst activity and throughput. Multiple fixed-bed reactors connected in series can be used to achieve a relatively high conversion of heavy feedstocks having boiling point temperatures greater than or equal to a cut point temperature in the range 300° C. to 400° C., but such designs require high capital investment and, for certain feedstocks, can be commercially impractical such as by needing catalysts replacement every 3-4 months.

The ebullated-bed reactor was developed to overcome plugging problems commonly associated with fixed-bed reactors during processing of relatively heavy feedstocks, such as vacuum residues, as the conversion requirements increase. An ebullated-bed reactor can include concurrently flowing streams of liquids or slurries of liquids, solids, and gas, through a vertically-oriented cylindrical vessel containing catalyst. The catalyst is placed in motion in the liquid and has a gross volume dispersed through the liquid medium that is greater than the volume of the mass when stationary. In an ebullated-bed reactor, the catalyst is in an expanded bed, thereby countering plugging problems associated with fixed-bed reactors. The fluidized nature of the catalyst in an ebullated-bed reactor also enables on-line catalyst replacement of a small portion of the catalyst bed. This results in a high net bed activity which does not vary with time.

Moving-bed reactors combine certain advantages of fixed-bed operations and the relatively easy catalyst replacement of ebullated-bed technology. Operating conditions are generally more severe than those typically used in fixed-bed reactor, such as pressures that can exceed 200 kilograms per square centimeter ($kg/cm^2$) and temperatures that can be in the range of from 400° C. to 430° C. During catalyst replacement in the moving-bed reactor, catalyst movement is slow compared to the linear velocity of the feed. Catalyst addition and withdrawal are performed, for instance, via a sluice system at the top and bottom of the reactor. The advantage of the moving-bed reactor is that the top layer of the moving-bed comprises fresh catalyst, and contaminants deposited on the top of the bed move downward with the catalyst and are released during catalyst withdrawal at the bottom. The tolerance to metals and other contaminants is therefore much greater than in a fixed-bed reactor. With this capability, the moving-bed reactor has advantages for hydroprocessing of very heavy feeds, especially when several reactors are combined in series.

Slurry-phase hydrocracking is a technology that can process residual oils with greater metal content, sulfur content, and greater micro carbon residue, to achieve a conversion level as high as 95 volume percent. The catalyst plays a significant role in slurry-phase hydrocracking. A catalyst with greater activity will result in greater yield of light fuel oil and reduced yield of coke. There are two kinds of catalyst for slurry-phase hydrocracking: heterogeneous solid powder catalysts and homogeneously dispersed catalysts. However, the former, such as hematite, lignite coke, and red mud are no longer used because of the difficulty in separation and equipment wear caused by the high dosages of these catalysts. Many homogeneously dispersed catalysts have been studied and developed and many can be formulated as water-soluble catalysts and oil-soluble catalysts. Homogeneously dispersed catalysts can be metal compounds, and the metal is selected from elements of group IV B-VIII among which the molybdenum, nickel, cobalt and chromium are commonly used. The homogeneously dispersed catalyst and feedstock oil are added into the reactor simultaneously.

One major technical challenge posed when hydroprocessing heavy oil fractions, such as atmospheric residues or vacuum residues, is the effect of small concentrations of contaminants, such as, for example, organic nickel, vanadium compounds, and poly-nuclear aromatic compounds. These organometallic compounds and others have been proven to reduce the activity or useful life of hydroprocessing catalysts. The presence of such metal contaminants and poly-nuclear aromatics can result in reduced process performance, increased capital costs, increased operating costs of refinery processing units, or combinations of these effects. The metals in the residual fraction of the crude oil deposits on the hydroprocessing catalyst and results in catalyst deactivation. The poly-nuclear aromatic compounds are coke precursors, and at high temperatures, they form coke, which also causes catalyst deactivation.

Hydrocarbon feedstocks, such as atmospheric residues and vacuum residues, can also include core materials, such as asphaltenes, dispersed in lower polarity solvent. Intermediate polarity materials, usually referred to as resins, can associate with the polar core materials to maintain a homogeneous mixture of the components. Asphaltenes are organic heterocyclic macromolecules, which occur in crude oils. Under normal reservoir conditions, asphaltenes are stabilized in the crude oil by maltenes and resins that are chemically compatible with the asphaltene compounds but that have lesser molecular weight. Polar portions or regions of the maltenes and resins surround the asphaltene compounds while non-polar regions are attracted to the oil phase. However, changes in pressure, temperature or concentration of the crude oil can alter the stability of the dispersion and increase the tendency of the asphaltene compounds to agglomerate into larger particles. As these asphaltene agglomerates grow, so does their tendency to precipitate out of solution.

One of the problems encountered during hydroprocessing of heavy oils, such as atmospheric residues or vacuum residues is sediment formation. The formation of sediments is related to the asphaltenes content in the residue. During hydroprocessing of heavy oils, the severe conditions in the hydroprocessing unit may breakdown the oil fractions that stabilize and solubilize asphaltene compounds and other coke precursors. Destruction of the stabilization system for the asphaltene compounds and other coke precursors may result in precipitation of asphaltene compounds and other coke precursors from the hydrotreated effluent. The precipitated asphaltene compounds and other coke precursors may deposit on hydroprocessing catalysts, causing deactivation of the hydroprocessing catalysts. Deactivation of the hydroprocessing catalysts caused by deposition of asphaltenes and coke on the hydroprocessing catalyst may reduce the yield of products and intermediates from the process and may cause problems with catalyst life and smooth operation of the hydroprocessing unit. Even at small concentrations, such as less than 0.5 weight percent, asphaltene compounds and other coke precursors can cause significant deactivation of hydroprocessing catalysts. Further, sediment formed during hydroprocessing operations may settle and deposit in such apparatuses as the catalytic reactor, distillation units, heat exchangers in the fractionation section, storage tanks, piping, or combinations of these. This affects the overall economy of the system since the reactor system cannot reach higher conversions.

SUMMARY

Accordingly, there is an ongoing need for systems and processes for separating and upgrading crude oil to increase production of valuable products and intermediates while at the same time reducing sedimentation in hydroprocessing units for upgrading atmospheric or vacuum residues and operations downstream of hydroprocessing units. The inventors have found that the aromatic bottoms stream from an aromatics recovery unit for processing a reformate can increase the solvency of heavy oils, which may increase the solubility of asphaltene compounds in the heavy oils subjected to hydroprocessing. The present disclosure is directed to integrated systems and processes to upgrade atmospheric residues or vacuum residues through hydroprocessing in a hydroprocessing unit while reducing sedimentation and increasing yields of valuable products and intermediates by passing at least a portion of an aromatic bottoms stream from an aromatics recovery unit to the hydroprocessing unit. The portion of the aromatic bottoms stream passed from the aromatics recovery unit to the hydroprocessing unit can be combined with the atmospheric or vacuum residue upstream of the hydroprocessing unit, combined with the hydroprocessed effluent at the outlet of the hydroprocessing unit, combined with a fuel oil effluent separated from the hydroprocessed effluent, or combinations of these. The aromatic compounds in the aromatic bottoms stream may increase the solvency of the hydrocarbon feed (atmospheric or vacuum residue), the hydroprocessed effluent, fuel oil effluent, or combinations, to increase the solubility of asphaltene compounds in these materials. The increased solubility of the asphaltenes may reduce or prevent precipitation of the asphaltenes, leading to reduced sedimentation. Combining the portion of the aromatic bottoms stream with the hydrocarbon feed to the hydroprocessing unit may increase the conversion of hydrocarbons in the aromatic bottoms stream to valuable products, chemical intermediates, or both.

The integrated system for separating and upgrading crude oil may include an atmospheric distillation unit (ADU) in fluid communication with the inlet stream comprising the crude oil. The crude oil may be passed to the ADU, which may be operable to separate the inlet stream into at least a naphtha stream, a diesel stream, and an atmospheric residue.

The integrated system may include a naphtha hydrotreating unit (NHT) in fluid communication with the ADU. The naphtha stream may be passed to the NHT, which may hydrotreat the naphtha stream with hydrogen in the presence of at least one hydrotreating catalyst to produce a hydrotreated naphtha. The integrated system may further include a naphtha reforming unit (NREF) disposed downstream of and in fluid communication with the NHT. The hydrotreated naphtha may be passed to the NREF, which may reform the hydrotreated naphtha from the NHT to produce a reformate and a hydrogen stream. The integrated system includes an aromatics recovery complex (ARC), which may be disposed downstream of the NREF and may be in fluid communication with the NREF. The reformate may be passed to the ARC, which processes the reformate to produce at least one aromatic product, an aromatic bottoms stream, and optionally a gasoline pool stream. The integrated system may include a diesel hydrotreating unit (DHT) in fluid communication with the ADU. The diesel stream may be passed to the DHT, which may hydrotreat the diesel fraction with hydrogen in the presence of at least one hydrotreating catalyst to produce a low sulfur diesel. One portion of the aromatic bottoms stream may be passed to the DHT or may be combined with the diesel stream upstream of the DHT. The integrated process may further include a vacuum distillation unit (VDU) in fluid communication with ADU. The atmospheric residue from the ADU may be passed to the VDU, which may separate the atmospheric residue into at least one vacuum gas oil and a vacuum residue. The vacuum gas oil may be further upgraded through fluidized catalytic cracking or hydrocracking.

The integrated system further includes a residue hydroprocessing unit (RHPU) in fluid communication with a residue inlet stream. The residue inlet stream may include the vacuum residue from the VDU or the atmospheric residue from the ADU. The residue inlet stream may also include at least a portion of the aromatic bottoms stream. The RHPU may include a hydroprocessing reactor and a hydroprocessed effluent separation system downstream of the hydroprocessing reactor. The hydroprocessing reactor may contact the residue with hydrogen in the presence of at least one hydroprocessing catalyst to produce a hydroprocessed effluent, and the hydroprocessed effluent separation system may separate the hydroprocessed effluent into at least a fuel oil effluent and at least one distillate effluent. The fuel oil effluent may be a fuel oil product that may be passed out of the system 100. At least a portion of the aromatic bottoms stream can be combined with the residue (atmospheric residue or vacuum residue of the residue inlet stream), the hydroprocessed effluent downstream of the hydroprocessing reactor, the fuel oil effluent downstream of the hydroprocessed effluent separation system, or combinations of these. As discussed previously, the portion of the aromatic bottoms stream combined with the residue, hydroprocessed effluent, fuel oil effluent, or combinations of these may increase the solvency of these streams and increase the solubility of asphaltene compounds in these streams. The increased solubility of asphaltene compounds may reduce or prevent agglomeration of asphaltene compounds in the hydroprocessing unit and sedimentation in the hydroprocessing unit and downstream unit operations and equipment.

According to at least one aspect of the present disclosure, a process for separating and upgrading a hydrocarbon feed may include passing the hydrocarbon feed to a distillation unit that may separate the hydrocarbon feed into at least a naphtha stream and a residue, passing the naphtha stream to a naphtha hydrotreating unit that may hydrotreat the naphtha stream to produce a hydrotreated naphtha, passing the hydrotreated naphtha to a naphtha reforming unit that may reform the hydrotreated naphtha to produce a reformate, passing the reformate to an aromatics recovery complex that may process the reformate to produce at least one aromatic product effluent and an aromatic bottoms stream, passing at least a portion of the residue to a residue hydroprocessing unit that may hydroprocess the portion of the residue in a hydroprocessing reactor to produce a hydroprocessed effluent, passing the hydroprocessed effluent to a hydroprocessed effluent separation system of the residue hydroprocessing unit that may separate the hydroprocessed effluent into at least a fuel oil effluent and at least one distillate effluent, and combining at least a portion of the aromatic bottoms stream with the residue, the hydroprocessed effluent, the fuel oil effluent, or combinations of these. Combining the portion of the aromatic bottoms stream with the residue, the hydroprocessed effluent, the fuel oil effluent, or combinations of these, may increase the solubility of the asphaltene compounds in the hydroprocessed effluent, the fuel oil effluent, or both, or may reduce sedimentation in the hydroprocessing reactor, the hydroprocessed effluent, the hydroprocessed effluent separation system, the fuel oil effluent, or other downstream equipment.

According to at least one other aspect of the present disclosure, a method of hydroprocessing a hydrocarbon feed comprising asphaltenes to upgrade the hydrocarbon feed while reducing sedimentation may include passing the hydrocarbon feed to a hydroprocessing unit that may contact the hydrocarbon feed with hydrogen in the presence of one or a plurality of hydroprocessing catalysts in a hydroprocessing reactor, where the contacting may cause at least a portion of hydrocarbon compounds from the hydrocarbon feed to undergo chemical reaction to produce a hydroprocessed effluent. The method may further include passing the hydroprocessed effluent to a hydroprocessed effluent separation system that may separate the hydroprocessed effluent into a fuel oil effluent and at least one distillate effluent and passing a reformate to an aromatics recovery complex that may process the reformate to produce at least one aromatic product effluent and an aromatic bottoms stream. The method may further include combining at least a portion of the aromatic bottoms stream with the hydrocarbon feed, the hydroprocessed effluent, the fuel oil effluent, or combinations of these. Combining the at least a portion of the aromatic bottoms stream with the hydrocarbon feed, the hydroprocessed effluent, the fuel oil effluent, or combinations of these, may increase the solubility of the asphaltene compounds in the hydroprocessed effluent, the fuel oil effluent, or both, and may reduce sedimentation in the hydroprocessing reactor, the hydroprocessed effluent, the hydroprocessed effluent separation system, the fuel oil effluent, or other downstream equipment.

According to at least another aspect of the present disclosure, a system for upgrading a hydrocarbon feed may include a distillation unit operable to separate the hydrocarbon feed into at least a naphtha stream and a residue comprising asphaltene compounds, a naphtha hydrotreating unit disposed downstream of the distillation unit and operable to contact the naphtha stream with hydrogen in the presence of at least one hydrotreating catalyst to produce a hydrotreated naphtha, a naphtha reforming unit disposed downstream of the naphtha hydrotreating unit and operable to reform the hydrotreated naphtha to produce a reformate, an aromatics recovery complex operable to separate the reformate into at least one aromatic product effluent and an aromatic bottoms stream, and a residue hydroprocessing unit comprising a hydroprocessing reactor and a hydroprocessed effluent separation system downstream of the hydroprocessing reactor. The hydroprocessing reactor may be operable to contact the residue with hydrogen in the presence of at least one hydroprocessing catalyst to produce a hydroprocessed effluent, and the hydroprocessed effluent separation system may be operable to separate the hydroprocessed effluent into a fuel oil effluent and at least one distillate effluent. The system may further include an aromatic bottoms transfer line operable to transfer at least a portion of the aromatic bottoms stream from the aromatics recovery complex to the residue hydroprocessing unit, where the portion of the aromatic bottoms stream can increase the solubility of asphaltenes in the hydroprocessing reactor, the hydroprocessed effluent, the fuel oil effluent, or combinations of these, to reduce or prevent sedimentation in downstream equipment.

According to at least another aspect of the present disclosure, a system for hydroprocessing a hydrocarbon feed comprising asphaltene compounds while reducing sedimentation may include a hydroprocessing unit comprising a hydroprocessing reactor and a hydroprocessed effluent separation system downstream of the hydroprocessing reactor. The hydroprocessing reactor may be operable to contact the hydrocarbon feed with hydrogen in the presence of at least one hydroprocessing catalyst to produce a hydroprocessed effluent, and the hydroprocessed effluent separation system may be operable to separate the hydroprocessed effluent into a fuel oil effluent and at least one distillate effluent. The system may further include an aromatics recovery complex operable to separate a reformate stream into at least one aromatic product effluent and an aromatic bottoms stream and an aromatic bottoms transfer line operable to transfer at least a portion of the aromatic bottoms stream from the aromatics recovery complex to the hydroprocessing unit, where the portion of the aromatic bottoms stream may increase the solubility of asphaltenes in the hydroprocessing reactor, the hydroprocessed effluent, the fuel oil effluent, or combinations of these, to reduce or prevent sedimentation of asphaltenes in downstream equipment.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
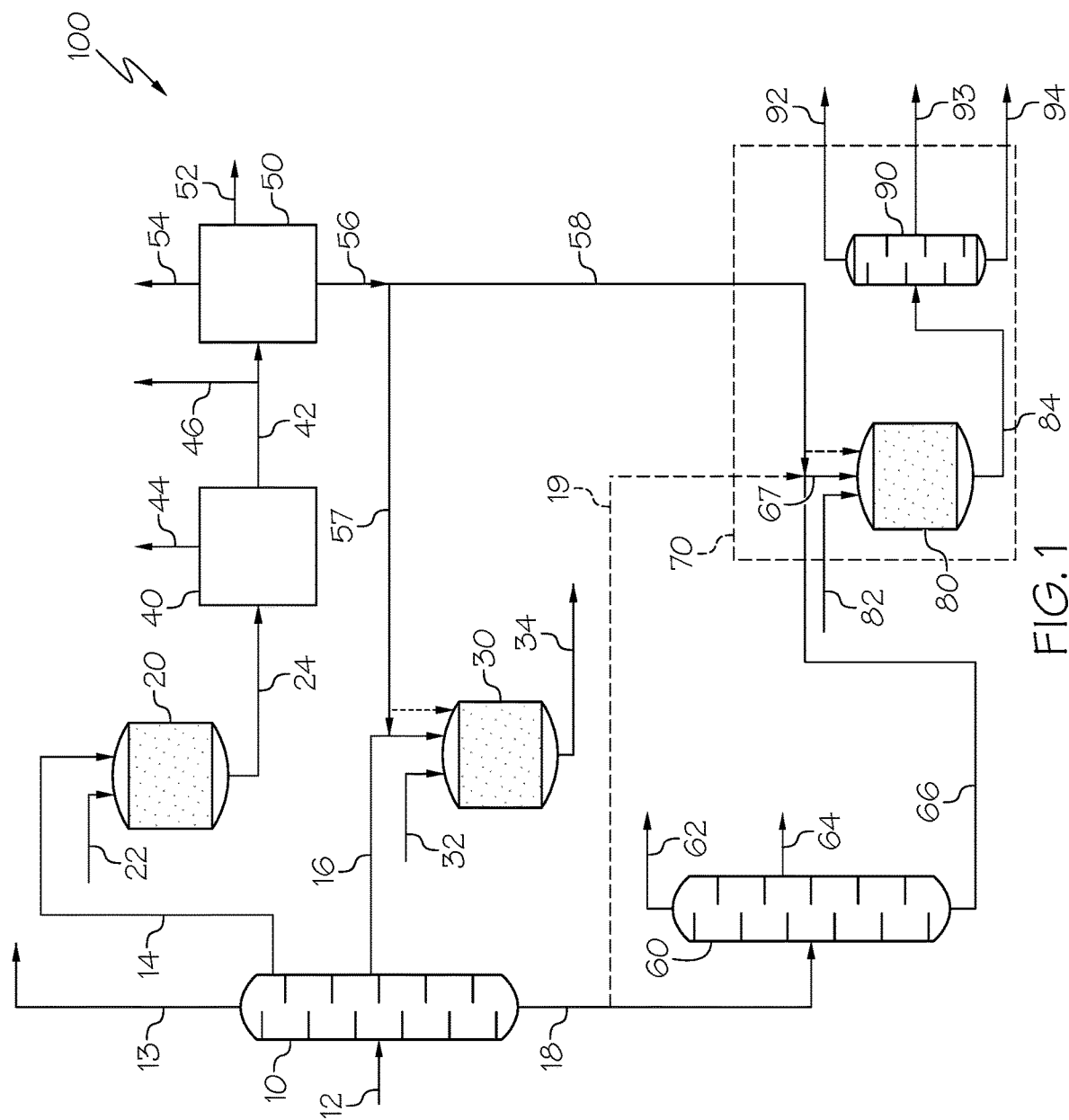
FIG. 1 schematically depicts a generalized flow diagram of a system for separating and upgrading crude oil, according to one or more embodiments shown and described in this disclosure.

For the purpose of describing the simplified schematic illustrations and descriptions of FIGS. 1-8, the numerous valves, temperature sensors, electronic controllers and the like that may be employed and well known to those of ordinary skill in the art of certain chemical processing operations are not included. Further, accompanying components that are often included in chemical processing operations, such as, for example, air supplies, heat exchangers, surge tanks, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-8. Mixing or combining may also include mixing by directly introducing both streams into the same reactor, separation device, or other system component. For example, it should be understood that when two streams are depicted as being combined directly prior to entering a separation unit or reactor, that in some embodiments the streams could equivalently be introduced into the separation unit or reactor individually and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

The present disclosure is directed to systems and methods for separating and upgrading a hydrocarbon feed, such as crude oil, to produce more valuable products and chemical intermediates, such as fuel blending components, aromatic compounds, olefins, or combinations of these. The present disclosure may also be directed to systems and methods for hydroprocessing a heavy oil, such as a residue stream, while reducing sedimentation. Referring to FIG. 1, one embodiment of a system 100 for upgrading a hydrocarbon feed 12 comprising crude oil or other heavy oil is schematically depicted. The system 100 may include one or more distillation units, such as atmospheric distillation unit (ADU) 10, vacuum distillation unit (VDU) 60, or both, which may separate the hydrocarbon feed 12 into at least a naphtha stream 14 and a residue comprising asphaltene compounds. The residue may be atmospheric residue 18 or vacuum residue 66. The system 100 may include a naphtha hydrotreating unit (NHT) 20 disposed downstream of the atmospheric distillation unit (ADU). The NHT 20 may contact the naphtha stream 14 with hydrogen 22 in the presence of at least one hydrotreating catalyst to produce a hydrotreated naphtha 24. The system 100 may further include a naphtha reforming unit (NREF) 40 disposed downstream of the NHT 20 and operable to reform the hydrotreated naphtha 24 to produce a reformate 42. The system 100 includes an aromatics recovery unit (ARC) 50 operable to separate the reformate 42 into at least one aromatic product effluent 52 and an aromatic bottoms stream 56. The system 100 further includes a residue hydroprocessing unit (RHPU) 70, which may include a hydroprocessing reactor 80 and a hydroprocessed effluent separation system 90 downstream of the hydroprocessing reactor 80. The hydroprocessing reactor 80 may contact the residue (atmospheric residue 18 from atmospheric residue transfer line 19, vacuum residue 66, or a combination of these) with hydrogen 82 in the presence of at least one hydroprocessing catalyst to produce a hydroprocessed effluent 84. The hydroprocessed effluent separation system 90 may separate the hydroprocessed effluent 84 into a fuel oil effluent 94 and at least one distillate effluent 93, a light gas effluent 92, or both. The system 100 may further include an aromatic bottoms transfer line 58 operable to transfer at least a portion of the aromatic bottoms stream 56 from the ARC 50 to the RHPU 70. The portion of the aromatic bottoms stream 56 passed back to the RHPU 70 through the aromatic bottoms transfer line 58 may increase the solubility of asphaltenes in the hydroprocessing reactor 80, the hydroprocessed effluent 84, the fuel oil effluent 94, or combinations of these, to reduce or prevent sedimentation.

The system 100 may be utilized in a process for separating and upgrading the hydrocarbon feed 12. The process for separating and upgrading the hydrocarbon feed 12 may include passing the hydrocarbon feed 12 to the distillation unit (ADU 10, VDU 60, or both) that may separate the hydrocarbon feed 12 into at least the naphtha stream 14 and the residue (atmospheric residue 18, atmospheric residue transfer line 19 or vacuum residue 66), passing the naphtha stream 14 to the NHT 20 that may hydrotreat the naphtha stream 14 to produce the hydrotreated naphtha 24, passing the hydrotreated naphtha 24 to the NREF 40 that may reform the hydrotreated naphtha 24 to produce the reformate 42, and passing the reformate 42 to the ARC 50 that may process the reformate 42 to produce the at least one aromatic product effluent 52 and the aromatic bottoms stream 56. The process further includes passing at least a portion of the residue to the hydroprocessing reactor 80 that hydroprocesses the portion of the residue (atmospheric residue 18, atmospheric residue transfer line 19 or vacuum residue 66) to produce the hydroprocessed effluent 84 and passing the hydroprocessed effluent 84 to the hydroprocessed effluent separation system 90 that separates the hydroprocessed effluent 84 into at least the fuel oil effluent 94 and at least one distillate effluent 93, a light gas effluent 92, or both. The process further includes combining at least a portion of the aromatic bottoms stream 56 with the residue, the hydroprocessed effluent 84, the fuel oil effluent 94, or combinations of these. Combining the portion of the aromatic bottoms stream 56 with the residue, the hydroprocessed effluent 84, the fuel oil effluent 94, or combinations of these, can increase the solubility of asphaltene compounds in the hydroprocessed effluent 84, the fuel oil effluent 94, or both, which may reduce sedimentation in the hydroprocessed effluent 84, the fuel oil effluent 94, or both.

Maintaining or increasing the solubility of asphaltene compounds in the hydroprocessed effluent 84, fuel oil effluent 94, or both, may reduce sedimentation and fouling in the hydroprocessing reactor 80, the hydroprocessed effluent separation system 90, heat exchangers and process equipment downstream of the RHPU 70, or combinations of these. Additionally, passing a portion of the aromatic bottoms stream 56 back to the hydroprocessing reactor 80 may enable additional conversion of aromatic compounds in the aromatic bottoms stream 56 to fuel oil and distillates through hydroprocessing, which may increase the overall yield of valuable products and intermediates from the process.

As used in this disclosure, a "reactor" refers to any vessel, container, or the like, in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed within a reactor. As used in this disclosure, a "reaction zone" refers to an area in which a particular reaction takes place in a reactor. For example, a packed bed reactor with multiple catalyst beds may have multiple reaction zones, in which each reaction zone is defined by the area of each catalyst bed.

As used in this disclosure, a "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used in this disclosure, the term "fractionation" may refer to a process of separating one or more constituents of a composition in which the constituents are divided from each other during a phase change based on differences in properties of each of the constituents. As an example, as used in this disclosure, "distillation" refers to separation of constituents of a liquid composition based on differences in the boiling point temperatures of constituents of a composition.

Further, in some separation processes, a "lesser-boiling effluent" and a "greater-boiling effluent" may separately exit the separation unit. In general, the lesser-boiling effluent has a lesser boiling point temperature than the greater-boiling effluent. Some separation systems may produce a "middle-boiling effluent," which may include constituents having boiling point temperatures between the boiling point temperatures of the lesser-boiling effluent and the greater-boiling effluent. The middle-boiling effluent may be referred to as a middle distillate. Some separation systems may be operable to produce a plurality of streams, each with a different boiling point range. It should be additionally understood that where only one separation unit is depicted in a figure or described, two or more separation units may be employed to carry out the identical or substantially identical separations. For example, where a distillation column with multiple outlets is described, it is contemplated that several separators arranged in series may equally separate the feed stream and such embodiments are within the scope of the presently described embodiments.

As used in this disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

As used in this disclosure, the term "initial boiling point" or "IBP" of a composition may refer to the temperature at which the constituents of the composition with the least boiling point temperatures begin to transition from the liquid phase to the vapor phase. As used in this disclosure, the term "end boiling point" or "EBP" of a composition may refer to the temperature at which the greatest boiling temperature constituents of the composition transition from the liquid phase to the vapor phase. A hydrocarbon mixture may be characterized by a distillation profile expressed as boiling point temperatures at which certain weight percentages of the composition has transitioned from the liquid phase to the vapor phase.

As used in this disclosure, the term "effluent" may refer to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slip stream may carry some of the effluent away, meaning that only a portion of the effluent may enter the downstream system unit. The term "reaction effluent" may more particularly be used to refer to a stream that is passed out of a reactor or reaction zone.

As used in this disclosure, a "catalyst" may refer to any substance which increases the rate of a specific chemical reaction. Catalysts described in this disclosure may be utilized to promote various reactions, such as, but not limited to, hydrodemetalization, hydrodesulfurization, hydrodenitrogenation, hydrodearomatization, hydrocracking, cracking, hydrodearylation, hydrotreating, reforming, isomerization, or combinations thereof.

As used in this disclosure, "cracking" generally refers to a chemical reaction where a molecule having carbon-carbon bonds is broken into more than one molecule by the breaking of one or more of the carbon-carbon bonds; where a compound including a cyclic moiety, such as an aromatic compound, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality. As used throughout the present disclosure, "hydrocracking" may refer to catalytic cracking of hydrocarbons conducted in the presence of hydrogen.

As used throughout the present disclosure, the term "xylenes," when used without a designation of the isomer, such as the prefix para, meta, or ortho (or letters p, m, and o, respectively), may refer to one or more of meta-xylene, ortho-xylene, para-xylene, and mixtures of these xylene isomers.

As used throughout the present disclosure, the term "crude oil" or "whole crude oil" may refer to crude oil received directly from an oil field or from a desalting unit without having any fraction separated by distillation.

It should be understood that the reactions promoted by catalysts as described in this disclosure may remove a chemical constituent, such as only a portion of a chemical constituent, from a process stream. For example, a hydrodemetalization (HDM) catalyst may be present in an amount sufficient to promote a reaction that removes a portion of one or more metals from a process stream. A hydrodenitrogenation (HDN) catalyst may be present in an amount sufficient to promote a reaction that removes a portion of the nitrogen present in a process stream. A hydrodesulfurization (HDS) catalyst may be present in an amount sufficient to promote a reaction that removes a portion of the sulfur present in a process stream. A hydrodearomatization (HDA) catalyst may be present in an amount sufficient to promote a reaction that converts aromatics to naphthenes, paraffins, or both. A hydrocracking catalyst may be present in an amount sufficient to promote a reaction that converts aromatic compounds to naphthenes, paraffins, or both, which are greater value fuel products. It should be understood that, throughout this disclosure, a particular catalyst may not be limited in functionality to the removal, conversion, or cracking of a particular chemical constituent or moiety when it is referred to as having a particular functionality. For example, a catalyst identified in this disclosure as an HDN catalyst may additionally provide hydrodearomatization functionality, hydrodesulfurization functionality, or both.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

Referring now to FIG. 1, an embodiment of the system 100 for separating and upgrading the hydrocarbon feed 12 is schematically depicted. As previously discussed, the system 100 can include one or more distillation units, such as the ADU 10, the VDU 60, or both, the NHT 20 disposed downstream of the distillation units, the NREF 40 disposed downstream of the NHT 20, and the ARC 50 disposed downstream of the NREF 40. The system 100 can also include a diesel hydrotreating unit (DHT) 30 disposed downstream of the ADU 10. The DHT 30 may receive a diesel stream 16 from the ADU 10 and hydrotreat the diesel stream 16. The system 100 further includes the RHPU 70 downstream of the ADU 10, the VDU 60, or both.

The hydrocarbon feed 12 may include one or more heavy oils, such as but not limited to crude oil, vacuum residue, tar sands, bitumen, other heavy oil streams, or combinations of these. It should be understood that, as used in this disclosure, a "heavy oil" may refer to a raw hydrocarbon, such as crude oil, which has not been previously processed through distillation, or may refer to a hydrocarbon which has undergone some degree of processing prior to being introduced to the system 100 as the hydrocarbon feed 12. The hydrocarbon feed 12 may have a density of greater than or equal to 0.80 grams per milliliter. The hydrocarbon feed 12 may have an end boiling point (EBP) of greater than 565° C. The hydrocarbon feed 12 may have a concentration of nitrogen of less than or equal to 3000 parts per million by weight (ppmw).

In one or more embodiments, the hydrocarbon feed 12 may be a crude oil. The crude oil may have an American Petroleum Institute (API) gravity of from 20 degrees to 50 degrees. For example, the hydrocarbon feed 12 may include a light crude oil, a heavy crude oil, or combinations of these. Example properties for an exemplary grade of Arab light crude oil are listed in Table 1.

TABLE 1

Example of Arab Light Export Feedstock

| Analysis | Units | Value | Test Method |
|---|---|---|---|
| American Petroleum Institute (API) gravity | degree | 33.13 | ASTM D287 |
| Density | grams per milliliter (g/mL) | 0.8595 | ASTM D287 |
| Carbon Content | weight percent (wt. %) | 85.29 | ASTM D5291 |
| Hydrogen Content | wt. % | 12.68 | ASTM D5292 |
| Sulfur Content | wt. % | 1.94 | ASTM D5453 |
| Nitrogen Content | parts per million by weight (ppmw) | 849 | ASTM D4629 |
| Asphaltenes | wt. % | 1.2 | ASTM D6560 |
| Micro Carbon Residue (MCR) | wt. % | 3.4 | ASTM D4530 |
| Vanadium (V) Content | ppmw | 15 | IP 501 |
| Nickel (Ni) Content | ppmw | 12 | IP 501 |
| Arsenic (As) Content | ppmw | 0.04 | IP 501 |
| Boiling Point Distribution | | | |
| Initial Boiling Point (IBP) | Degrees Celsius (° C.) | 33 | ASTM D7169 |
| 5% Boiling Point (BP) | ° C. | 92 | ASTM D7169 |
| 10% BP | ° C. | 133 | ASTM D7169 |
| 20% BP | ° C. | 192 | ASTM D7169 |
| 30% BP | ° C. | 251 | ASTM D7169 |
| 40% BP | ° C. | 310 | ASTM D7169 |
| 50% BP | ° C. | 369 | ASTM D7169 |
| 60% BP | ° C. | 432 | ASTM D7169 |
| 70% BP | ° C. | 503 | ASTM D7169 |
| 80% BP | ° C. | 592 | ASTM D7169 |
| 90% BP | ° C. | >720 | ASTM D7169 |
| 95% BP | ° C. | >720 | ASTM D7169 |
| End Boiling Point (EBP) | ° C. | >720 | ASTM D7169 |
| BP range C5-180° C. | wt. % | 18.0 | ASTM D7169 |
| BP range 180° C.-350° C. | wt. % | 28.8 | ASTM D7169 |
| BP range 350° C.-540° C. | wt. % | 27.4 | ASTM D7169 |
| BP range >540° C. | wt. % | 25.8 | ASTM D7169 |

Weight percentages in Table 1 are based on the total weight of the crude oil.

When the hydrocarbon feed 12 comprises a crude oil, the crude oil may be a whole crude or may be a crude oil that has undergone at some processing, such as desalting, solids separation, scrubbing. For example, the hydrocarbon feed 12 may be a de-salted crude oil that has been subjected to a de-salting process. In some embodiments, the hydrocarbon feed 12 may include a crude oil that has not undergone pretreatment, separation (such as distillation), or other operation that changes the hydrocarbon composition of the crude oil prior to introducing the crude oil to the system 100.

The hydrocarbon feed 12 may be introduced to the distillation system. The hydrocarbon feed 12 may be fluidly coupled to the distillation system, such as to the ADU 10, so that the hydrocarbon feed 12 may be introduced to the distillation system. The distillation system may include one or more distillation units or other separation units that, in combination, may separate the hydrocarbon feed 12 into a plurality of streams, such as but not limited to one or more of a light gas stream 13, a naphtha stream 14, a diesel stream 16, an atmospheric residue 18, a light vacuum gas oil 62, a heavy gas oil 64, a vacuum residue 66, or combinations of these.

Referring to FIG. 1, the distillation system may include the ADU 10. The hydrocarbon feed 12 may be in fluid communication with an inlet of the ADU 10 so that the hydrocarbon feed 12 can be directly introduced to the ADU 10. The ADU 10 may operate to separate the hydrocarbon feed 12 into at least the naphtha stream 14 and the atmospheric residue 18. The ADU 10 may operate to further separate the hydrocarbon feed 12 to produce a light gas stream 13, a diesel stream 16, or other stream in addition to the naphtha stream 14 and the atmospheric residue 18. In embodiments, the ADU 10 may separate the hydrocarbon feed 12 into an ADU tops stream, an ADU middle stream, and an ADU bottoms stream, where the ADU tops stream comprises the naphtha stream 14, the ADU middle stream comprises the diesel stream 16, and the ADU bottoms comprises the atmospheric residue 18. The ADU 10 may include a single fractionation column or may include a plurality of atmospheric distillation units, which may be operated in series or in parallel to separate the hydrocarbon feed 12 into the various streams.

The naphtha stream 14 may include at least 90%, at least 95%, at least 98%, or at least 99% by weight of the constituents of the hydrocarbon feed having an atmospheric boiling point temperature of between 36 degrees Celsius (° C.) to 180° C. The diesel stream 16 may include at least 90%, at least 95%, at least 98%, or at least 99% of the constituents of the hydrocarbon feed 12 having an atmospheric boiling point temperature of between 180° C. to 370° C. The atmospheric residue 18 may include at least 90%, at least 95%, at least 98%, or at least 99% of the constituents of the hydrocarbon feed 12 having an atmospheric boiling point temperature of greater than or equal to 370° C. The atmospheric residue 18 may include at least 1 wt. %, at least 2 wt. %, at least 5 wt. %, or even at least 10 wt. % asphaltene compounds based on the total weight of the atmospheric residue 18. The light gas stream 13 may include compounds dissolved in the crude oil that are normally gases at atmospheric conditions. The light gas stream 13 may include at least 90%, at least 95%, at least 98%, or even at least 99% of the constituents of the hydrocarbon feed 12 having an atmospheric boiling point temperature of less than or equal to 36° C. The light gas stream 13 may include methane, ethane, propane, butanes, hydrogen sulfide, ammonia, or combinations of these.

Referring again to FIG. 1, the system 100 may include the VDU 60, which may be disposed downstream of the ADU 10. VDU 60 may be in fluid communication with the ADU 10 so that the atmospheric residue 18 can be passed directly from the ADU 10 to the VDU 60. In embodiments, a portion of the atmospheric residue 18 may be passed directly to the RHPU 70 through atmospheric residue transfer line 19. The VDU may separate the atmospheric residue 18 into one or more vacuum gas oil effluents and a vacuum residue 66. The VDU 60 may include a single vacuum distillation unit or a plurality of vacuum distillation units, which may be operated in series or in parallel. The vacuum gas oil effluents may include a light vacuum gas oil (LVGO) 62, a heavy vacuum gas oil (HVGO) 64, or combinations of these. The LVGO 62, the HVGO 64, or both may be further processed through hydrocracking or fluidized catalytic cracking to further upgrade the LVGO 62, the HVGO 64, or both. The LVGO 62, the HVGO 64, or both, may have a concentration of asphaltene compounds less than 500 parts per million by weight based on the total weight of the LVGO 62, the HVGO 64, or both, respectively.

The vacuum residue 66 may include constituents from the atmospheric residue 18 having boiling point temperatures greater than or equal to 565° C., such as from 565° C. to 750° C. The vacuum residue 66 may contain at least 90%, at least 95%, at least 98%, or at least 99% by weight of the constituents of the atmospheric residue 18 having boiling point temperatures greater than or equal to 565° C. The LVGO 62, the HVGO 64, or both, may have a concentration of asphaltenes less than 500 parts per million by weight (ppmw) with the balance of the asphaltene compounds from the atmospheric residue 18 being present in the vacuum residue 66. In other words, the vacuum residue 66 may include an amount of asphaltene compounds from the atmospheric residue 18 sufficient for the concentration of asphaltene compounds in the LVGO 62, the HVGO 64, or both to be less than 500 ppmw. The vacuum residue 66 may include at least 95%, at least 98%, at least 99%, or at least 99.95% by weight of the asphaltene compounds from the atmospheric residue 18. The vacuum residue 66 may comprise at least 1 wt. % asphaltene compounds, such as at least 2 wt. %, at least 5 wt. %, or even at least 10 wt. % asphaltene compounds, based on the total weight of the vacuum residue 66. In embodiments, the vacuum residue 66 may have an API gravity of from 10 to 17. The vacuum residue 66 may have a specific gravity of from 0.950 to 1.16. The vacuum residue 66 may have a concentration of sulfur compounds of from 0.1 wt. % to 6 wt. % and a concentration of metals, such as but not limited to nickel and vanadium, of from 40 parts per million by weight (ppmw) to 1500 ppmw.

Referring again to FIG. 1, the system may include the NHT 20 disposed downstream of the distillation unit and may operate to contact the naphtha stream 14 with hydrogen in the presence of at least one hydrotreating catalyst to produce a hydrotreated naphtha 24. The NHT 20 may be in fluid communication with the ADU 10 to receive the naphtha stream 14 from the ADU 10. Hydrogen may be introduced to the NHT 20 through hydrogen stream 22, which may be directly passed to the NHT 20 or combined with the naphtha stream 14 upstream of the NHT 20.

Contact of the naphtha stream 14 with hydrogen in the presence of the hydrotreating catalysts in the NHT 20 may remove at least a portion of the sulfur compounds, nitrogen compounds, or both, from the naphtha stream 14. The NHT 20 may be operated at operating conditions, such as temperature, pressure, hydrogen partial pressure, liquid hourly space velocity (LHSV), and catalyst selection and loading, which are effective to remove at least enough sulfur and nitrogen to meet requisite product specifications. In embodiments, the NHT 20 may be operated under relatively mild conditions that are sufficient to reduce the total concentration of nitrogen compounds and sulfur compounds in the hydrotreated effluent 24 to less than or equal to 0.5 parts per million by weight based on the total weight of the hydrotreated effluent 24.

The hydrotreating catalyst in the NHT 20 is not particularly limited and may include any hydrotreating catalyst capable of hydrotreating the naphtha stream 14 to remove nitrogen compounds or other species having an adverse effect on the NREF 40 downstream of the NHT 20. The hydrotreating catalyst may include one or more metals from Groups 5, 6, or 8-10 of the International Union of Pure and Applied Chemistry periodic table of the elements (IUPAC periodic table), which may be in the form of metals, metal oxides, or metal sulfides. The hydrotreating catalyst may further comprise a support material, such as silica, alumina, titania, or combination of these, and the metal(s) may be disposed on the support material. In embodiments, the hydrotreating catalyst in the NHT 20 may be a hydrodenitrogenation catalyst (HDN catalyst) that may contain at least one metal from IUPAC Group 6, such as molybdenum, and at least one metal from IUPAC Groups 8-10, such as nickel. The HDN catalyst can also include at least one dopant selected from the group consisting of boron, phosphorus, silicon, halogens, and combinations thereof. Other hydrotreating catalysts are contemplated.

The operating conditions of the NHT 20 are not particularly limited. The NHT 20 may be operated at a hydrotreating temperature of from 250° C. to 400° C., such as from 350° C. to 380° C. The NHT 20 may be operated at a hydrotreating pressure of from 10 bar (1,000 kilopascals (kPa)) to 50 bar (5,000 kPa), such as from 20 bar (2,000 kPa) to 40 bar (4,000 kPa). The NHT 20 may operate with a liquid hourly volume space velocity (LHSV) of from 2 per hour ($hr^{-1}$) to 10 $hr^{-1}$, such as from 4 $hr^{-1}$ to 8 $hr^{-1}$. The volume ratio of hydrogen 22 to the naphtha stream 14 introduced to the NHT 20 may be from 50:1 to 300:1.

Referring again to FIG. 1, the system 100 may include the NREF 40, which may be disposed downstream of the NHT 20. The NREF 40 may be in fluid communication with the NHT 20 and may receive the hydrotreated effluent 24 from the NHT 20. The hydrotreated effluent 24 may be passed directly from the NHT 20 to the NREF 40 without passing through any intervening reactor or separation system. The NREF 40 may operate to reform the hydrotreated naphtha 24 to produce a reformate 42. The NREF 40 may also produce a separate hydrogen effluent 44. The NREF 40 may include a reformed effluent separation system (not shown) that may be operable to separate an effluent from the reforming reactor into the reformate 42 and the hydrogen effluent 44. The hydrogen effluent 44 may be recovered or may be recycled back to one or more of the NHT 20, DHT 30, RHPU 70, or combinations of these as at least a portion of the hydrogen streams 22, 32, 82 to those reactors. The hydrogen effluent 44 may also be used as a portion of the hydrogen for hydrocracking one or both of the LVGO 62, HVGO, or both from the VDU 60.

The hydrotreated naphtha 24 may be passed to the NREF 40 to improve its quality, such as by increasing the octane number to produce the reformate 42 that can be used as a gasoline blending stream or feedstock for the ARC 50. Some gasoline blending pools include C4 and heavier hydrocarbons having atmospheric boiling points of less than 205° C. The NREF 40 may be a catalytic reforming process. In catalytic reforming processes, paraffins and naphthenes can be restructured to produce isomerized paraffins and aromatics of relatively higher octane numbers. Catalytic reforming can convert low octane n-paraffins to i-paraffins and naphthenes. Naphthenes can then be converted to higher octane aromatic compounds. The aromatic compounds present in the hydrotreated effluent 24 can remain unchanged or at least a portion of aromatic compounds from the hydrotreated effluent 24 may be hydrogenated to form naphthenes by reverse reactions taking place in the presence of hydrogen. The hydrogen may be generated during reforming of other constituents in the reforming unit and may be present in the reaction mixture.

The chemical reactions involved in catalytic reforming can be grouped into four categories, which include cracking, dehydrocyclization, dehydrogenation, and isomerization. A particular hydrocarbon molecule of the hydrotreated naphtha 24 may undergo one or more than one category of reaction during the reforming process to form one or a plurality of different molecules or products.

The reforming unit of the NREF 40 may contact the hydrotreated naphtha 24 with a reforming catalyst under operating conditions sufficient to cause at least a portion of the hydrotreated naphtha 24 to undergo one or more reactions to produce a reforming effluent, which may then be separated into the reformate 42 and the hydrogen effluent 44. The reforming unit of the NREF 40 may be operated at a temperature of from 400° C. to 560° C., or from 450° C. to 560° C. The reforming unit of the NREF 40 may be operated at a pressure of from 100 kilopascals (kPa) to 5,000 kPa (from 1 bar to 50 bar), or from 100 kPa to 2,000 kPa (from 1 bar to 20 bar). The reforming unit of the NREF 40 may be operated at a liquid hourly space velocity (LHSV) of from 0.5 per hour ($hr^{-1}$) to 4 $h^{-1}$ or from 0.5 $h^{-1}$ to 2 $h^{-1}$.

The reforming catalysts for catalytic reforming processes in the NREF 40 can be either mono-functional or bi-functional reforming catalysts, which can contain precious metals, such as one or more metals from Groups 8-10 of the IUPAC periodic table, as active components (Group VIIIB in the Chemical Abstracts Services (CAS) system). The metals may be supported on a catalyst support, such as but not limited to an alumina, silica, titania, or combination of these supports. The reforming catalyst can be a bi-functional catalyst that has both metal sites and acidic sites. In embodiments, the reforming catalyst may be a platinum or palladium supported on an alumina support. The composition of the hydrotreated naphtha 24, the impurities present in the hydrotreated naphtha 24, and the desired products in the reformate 42 may influence the selection of reforming catalyst, reforming process type, and operating conditions. Types of chemical reactions can be targeted by a selection of catalyst or operating conditions known to those of ordinary skill in the art to influence both the yield and selectivity of conversion of paraffinic and naphthenic hydrocarbon precursors to particular aromatic hydrocarbon structures.

The reforming reactor of the NREF 40 may be any one of several types of catalytic reforming process configurations, which differ in the manner in which they regenerate the reforming catalyst to remove the coke formed during the reforming process. Catalyst regeneration, which involves combusting detrimental coke in the presence of oxygen, can include a semi-regenerative process, a cyclic regeneration process, or continuous regeneration process. Semi-regeneration is the simplest configuration, and the entire unit, including all reactors in the series, are shut-down for catalyst regeneration in all reactors. Cyclic configurations utilize an additional "swing" reactor to permit one reactor at a time to be taken off-line for regeneration while the others remain in service. Continuous catalyst regeneration configurations, which are the most complex, provide for continuous operation by catalyst removal, regeneration and replacement. While continuous catalyst regeneration configurations may enable the severity of the operating conditions to be increased due to higher catalyst activity, the associated capital investment is necessarily higher.

Referring again to FIG. 1, the reformed effluent may be separated in a reformed effluent separation system (not shown) to produce the reformate 42 and the hydrogen effluent 44. The reformate 42 may be passed to the ARC 50. At least a portion of the reformate 42 may be sent to the gasoline pool in stream 46 to be blended with other gasoline components to meet the required specifications. As previously discussed, the hydrogen effluent 44 may be passed out of the system and recovered or may be passed (recycled)

back to the NHT 20, the DHT 30, or the RHPU 80 as all or part of the hydrogen introduced to those processes.

Referring again to FIG. 1, the ARC 50 may be disposed downstream of the NREF 40. The ARC 50 may be in fluid communication with the NREF 40 and may receive all or at least a portion of the reformate 42 from the NREF 40. The ARC 50 may process the reformate 42 to produce at least one aromatic product effluent 52 and an aromatic bottoms stream 56. The ARC 50 may be operable to separate the reformate 42 into the aromatic product effluent 52, a gasoline pool stream 54, and the aromatic bottoms stream 56. The ARC 50 may also be operable to convert one or more aromatic compounds in the reformate 42 to other aromatic compounds, such as xylenes or gasoline pool components.

In the ARC 50, the reformate 42 may be subjected to several processing steps to recover greater value products, such as xylenes and benzene, and to convert lower value products, such as toluene, into greater value products. For example, the aromatic compounds present in the reformate 42 can be separated into different fractions by carbon number, such as but not limited to a C5-fraction, a C6 fraction comprising benzene, a C7 fraction comprising toluene, a C8 fraction including xylenes, and ethylbenzene, and a C9+ fraction (aromatic bottoms stream 56). The C8 fraction may be subjected to one or more operations to convert ethylbenzene, ortho-xylene, and meta-xylene to produce greater yield of para-xylene, which is of greater value. Para-xylene can be recovered in high purity from the C8 fraction by separating the para-xylene from the ortho-xylene, meta-xylene, and ethylbenzene using selective adsorption or crystallization. The ortho-xylene and meta-xylene remaining from the para-xylene separation can be isomerized to produce an equilibrium mixture of xylenes. The ethylbenzene can be isomerized into xylenes or can be dealkylated to benzene and ethane. The para-xylene can then be separated from the ortho-xylene and the meta-xylene using adsorption or crystallization, and the para-xylene-depleted-stream can be recycled to extinction to the isomerization unit and then to the para-xylene recovery unit until all of the ortho-xylene and meta-xylene are converted to para-xylene and recovered.

Toluene can be recovered as a separate fraction, such as a C7 fraction, and then can be converted into greater value products, such as but not limited to benzene or xylenes. One toluene conversion process can include the disproportionation of toluene to make benzene and xylenes. Another toluene conversion process can include the hydrodealkylation of toluene to make benzene. Another toluene conversion process can include the transalkylation of toluene to make benzene and xylenes. Both toluene disproportionation and toluene hydrodealkylation can result in the formation of benzene.

Figure 2:
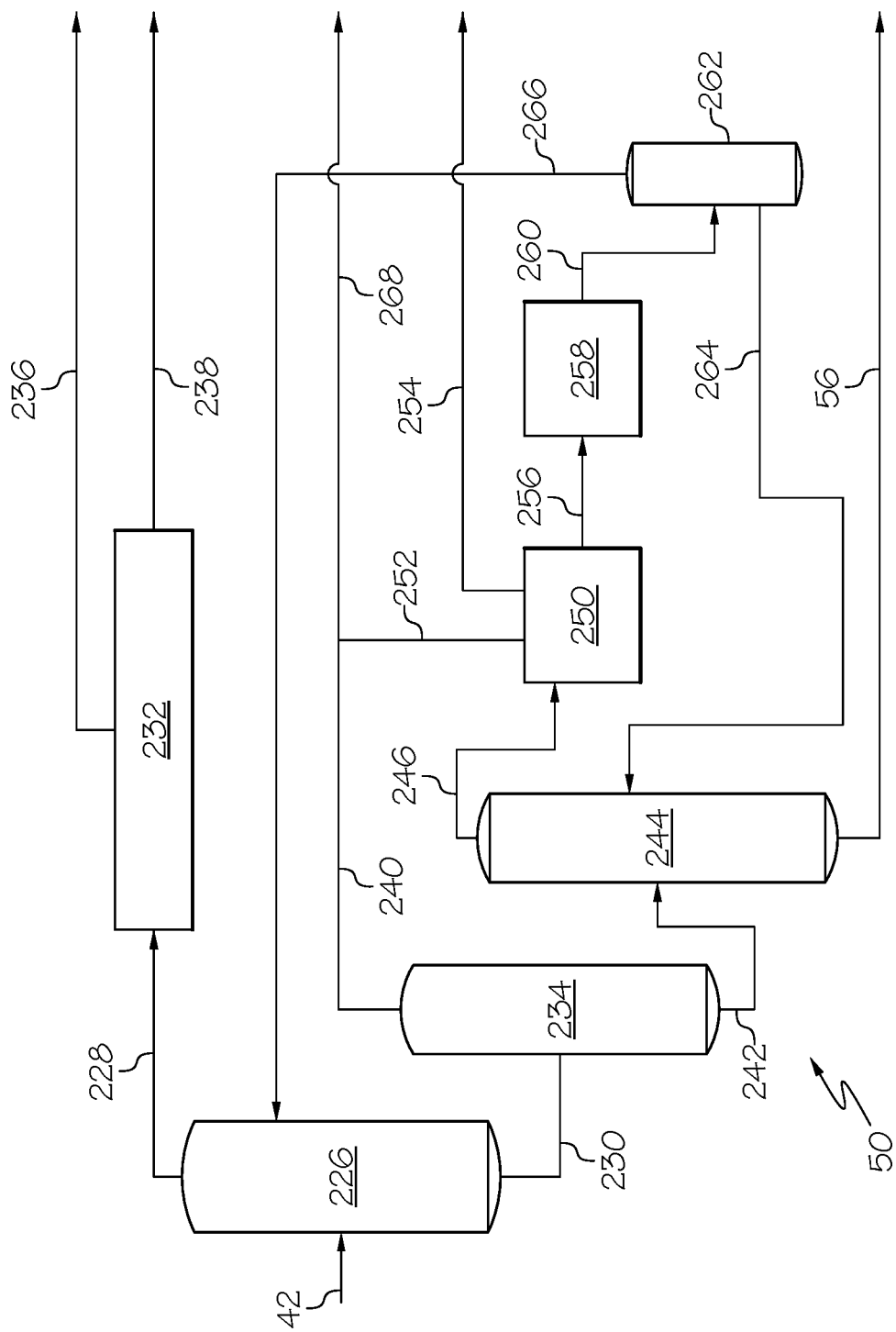
FIG. 2 schematically depicts a generalized flow diagram of an aromatics recovery system of the system for separating and upgrading crude oil of FIG. 1, according to one or more embodiments shown and described in this disclosure.

Referring to FIG. 2, an embodiment of the ARC 50 is schematically depicted. The reformate stream 42 from the NREF 40 (FIG. 1) can be passed to a reformate splitter 226 that can separate the reformate 42 into two fractions: a light reformate stream 228 comprising C5-C6 hydrocarbons, and a heavy reformate stream 230 comprising C7+ hydrocarbons. The light reformate stream 228 may be passed to a benzene extraction unit 232, which may extract the benzene as benzene product in benzene stream 238 and recover substantially benzene-free gasoline in raffinate motor gasoline (mogas) stream 236. The heavy reformate stream 230 may be passed to a splitter 234 which may separate the heavy reformate stream 230 to produce a C7 mogas stream 240 and a C8+ hydrocarbon stream 242. The C8+ hydrocarbon stream 242 may be passed to a clay tower (not shown) to remove olefin compounds from the C8+ hydrocarbon stream 242.

Still referring to FIG. 2, the C8+ hydrocarbon stream 242 may be passed to a xylene rerun unit 244, which may separate the C8+ hydrocarbons stream 242 into a C8 hydrocarbon stream 246 and the aromatic bottoms stream 56, which is a C9+ hydrocarbon stream comprising C9+ hydrocarbons. C8 hydrocarbon stream 246 may be passed to a para-xylene recovery unit 250 that may recover para-xylene as para-xylene product stream 254. The para-xylene recovery unit 250 may also produce a C7 cut mogas stream 252, which may be combined with the C7 cut mogas stream 240 from splitter 234 to produce C7 cut mogas stream 268. Other xylenes (meta-xylene, ortho-xylene, and any trace para-xylene not passed out of unit 250 in the para-xylene product stream 254) may be recovered and passed to a xylene isomerization unit 258 through mixed xylene stream 256. The xylene isomerization unit 258 may isomerize at least a portion of ortho-xylene, meta-xylene, or both, in the mixed xylene stream 256 to para-xylene. The isomerization effluent 260 may be passed from the xylene isomerization unit 258 to a splitter column 262, which may separate the isomerization effluent 260 into a splitter top stream 266 and a splitter bottom stream 264. The splitter bottoms stream 264 may include the para-xylene produced in the xylene isomerization unit 258 as well as the remaining ortho-xylene and meta-xylene. The splitter bottoms stream 264 may be passed back to the xylene rerun unit 244 so that the xylenes can be separated and passed to the para-xylene recovery unit 250 for further recovery of para-xylene. The splitter top stream 266 may be recycled back to reformate splitter 226.

The raffinate mogas stream 236 may be passed out of the ARC 50 as the gasoline pool stream 54 (FIG. 1), which may be passed to the gasoline pool for blending into fuels. The gasoline pool stream 54 comprising the raffinate mogas stream 236 may have less than or equal to 3 volume percent benzene, or less than or equal to 1 volume percent benzene. The one or more aromatic product streams 52 (FIG. 1) passed out of the ARC 50 may include one or more of the benzene stream 238, the para-xylene product stream 254, the C7 cut mogas stream 268, or combinations of these. The aromatic bottoms stream 56 may include the C9+ aromatic compounds from the xylene rerun unit 244 of the ARC 50. The aromatic bottoms stream 56 may include the heavier fraction, such as C9+ alkylated mono-aromatics, and may be a more complex mixture of compounds including di-aromatics. The aromatic bottoms stream 56 may include C9+ aromatic compounds having an atmospheric boiling temperature in a range of from 150° C. to 350° C. Since olefins are detrimental in the extraction/adsorption process within the ARC 50, olefin compounds can be removed using a clay tower or selective hydrogenation. As previously discussed, the C8+ hydrocarbon stream 242 from the splitter 234 may be passed to a clay tower (not shown) to remove olefin compounds from the C8+ hydrocarbon stream 242. Due to the acidic nature of the clays, olefinic aromatics such as styrene can react with other aromatic molecule via an alkylation reaction to form bridged di-aromatic molecules. These di-aromatic molecules can end up in the aromatic bottoms stream 56.

Referring again to FIG. 1, the system 100 may include the DHT 30 downstream of the distillation unit. The DHT 30 may be in fluid communication with the ADU 10 to receive the diesel stream 16 from the ADU 10. The DHT 30 may be operable to contact at least a portion of the diesel stream 16 with hydrogen in the presence of at least one hydrotreating catalyst to produce a reduced sulfur diesel 34 having a sulfur content less than the diesel stream 16. Hydrogen may be introduced to the DHT 30 through hydrogen stream 32, which may be directly passed to the DHT 30 or combined with the diesel stream 16 upstream of the DHT 30.

Contact of the diesel stream 16 with hydrogen in the presence of the hydrotreating catalysts in the DHT 30 may remove at least a portion of the sulfur compounds from the diesel stream 16 to produce a reduced sulfur diesel 34 meeting stringent specifications for sulfur content, such as, for example, less than 10 parts per million sulfur by weight (ppmw). The DHT 30 may be operated at operating conditions, such as temperature, pressure, hydrogen partial pressure, liquid hourly space velocity (LHSV), and catalyst selection and loading, which are effective to remove at least enough sulfur to reduce the sulfur content of the reduced sulfur diesel 34 to less than 10 ppmw.

The hydrotreating catalyst in the DHT 30 is not particularly limited and may include any hydrotreating catalyst or combination of hydrotreating catalysts capable of hydrotreating the diesel stream 16 to remove sulfur compounds or other contaminants to produce the low-sulfur diesel 34 meeting quality specifications. The hydrotreating catalyst may include one or more metals from Groups 5, 6, or 8-10 of the International Union of Pure and Applied Chemistry periodic table of the elements (IUPAC periodic table), which may be in the form of metals, metal oxides, or metal sulfides. The hydrotreating catalyst may further comprise a support material, such as silica, alumina, titania, or a combination of these, and the metal(s) may be disposed on the support material. In embodiments, the hydrotreating catalyst in the DHT 30 may include a hydrodesulfurization catalyst (HDS catalyst) comprising one or more metals from Group 6 and one metal from Groups 8-10 of the IUPAC periodic table, which may be present as metals, metal oxides, or metal sulfides, supported on the support material. The HDS catalyst may also contain a dopant that is selected from the group consisting of boron, phosphorus, halogens, silicon, and combinations thereof.

The operating conditions of the DHT 30 are not particularly limited. The DHT 30 may be operated at a hydrotreating temperature of from 300° C. to 420° C., such as from 350° C. to 400° C. The DHT 30 may be operated at a hydrotreating pressure of from 20 bar (2,000 kilopascals (kPa)) to 80 bar (8,000 kPa), such as from 30 bar (3,000 kPa) to 60 bar (6,000 kPa). The DHT 30 may operate with a liquid hourly volume space velocity (LHSV) of from 0.5 per hour ($hr^{-1}$) to 3 $hr^{-1}$, such as from 1 $hr^{-1}$ to 2 $hr^{-1}$. The volume ratio of hydrogen 32 to the diesel stream 16 introduced to the DHT 30 may be from 200:1 to 500:1.

Referring to FIG. 1, at least a portion of the aromatic bottoms stream 56 may be passed to the DHT 30 through aromatic bottoms DHT transfer line 57. The aromatic bottoms DHT transfer line 57 may fluidly couple the aromatic bottoms stream 56 to the DHT 30 and may transfer at least a portion of the aromatic bottoms stream 56 to the DHT 30. The aromatic bottoms DHT transfer line 57 may be in fluid communication with the diesel stream 16 so that the portion of the aromatic bottoms stream may be combined with the diesel stream 16 upstream of the DHT 30. Alternatively or additionally, the aromatic bottoms DHT transfer line 57 may be in fluid communication with the DHT 30 and operable to pass the portion of the aromatic bottoms stream directly and independently to the DHT 30. The portion of the aromatic bottoms stream may be processed in the DHT 30 to increase the quality of the portion of the aromatic bottoms stream to be used as gasoline or diesel blending components.

Figure 7:
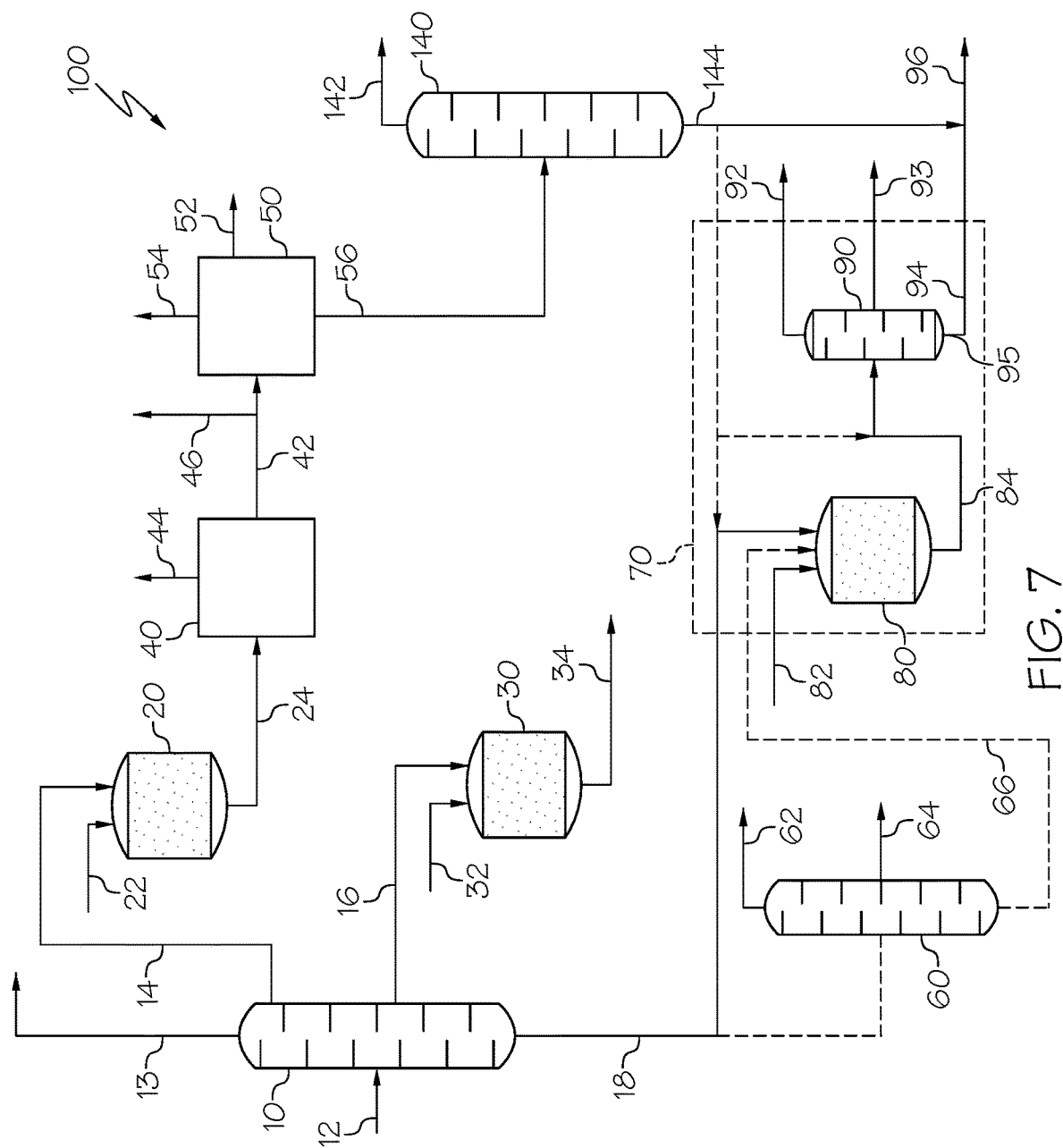
FIG. 7 schematically depicts a generalized flow diagram of another embodiment of a system for separating and upgrading crude oil, according to one or more embodiments shown and described in this disclosure.

The residue from the distillation unit is passed to the RHPU 70, which may be disposed downstream of and in fluid communication with the distillation unit. Referring to FIG. 1, the distillation unit may include the ADU 10 operable to separate the hydrocarbon feed 12 into at least the naphtha stream 14 and the atmospheric residue 18 and the VDU 60 disposed downstream of the ADU 10 and operable to separate the atmospheric residue 18 into the one or more vacuum gas oil effluents and the vacuum residue 66. When both the ADU 10 and the VDU 60 are present, the residue passed to the RHPU 70 may be the vacuum residue 66 from the VDU 60. In this case, the RHPU 70 may be in fluid communication with the VDU 60 and may receive the vacuum residue 66 from the VDU. In embodiments, at least a portion of the atmospheric residue 18 may be bypassed around the VDU 60 through atmospheric residue transfer line 19 so that at least a portion of the atmospheric residue 18 may be passed to the RHPU 70 and co-processed with the vacuum residue 66 in the RHPU 70. Referring now to FIG. 7, the distillation unit may include only the ADU 10, and the residue may be the atmospheric residue 18 from the ADU 10. In embodiments represented by FIG. 7, the RHPU 70 may be in fluid communication with the ADU 10 and may receive the atmospheric residue 18 directly from the ADU 10.

Referring again to FIG. 1, the RHPU 70 may contact the residue, such as the vacuum residue 66, with hydrogen in the presence of a at least one hydroprocessing catalyst to produce a hydroprocessed effluent 84 and may separate the hydroprocessed effluent 84 to produce a fuel oil effluent 94 and at least one distillate effluent 93, a light gas effluent 92, or both. The RHPU 70 may include at least one hydroprocessing reactor 80 and a hydroprocessed effluent separation system 90 disposed downstream of the hydroprocessing reactor 80.

Referring to FIG. 1, the hydroprocessing reactor 80 may be operable to contact the vacuum residue 66 with hydrogen in the presence of at least one hydroprocessing catalyst to produce the hydroprocessed effluent 84. The vacuum residue 66 may be introduced directly to the hydroprocessing reactor 80 or may be combined with the hydrogen stream 82 upstream of the hydroprocessing reactor 80. The hydrogen stream 82 may include recycled hydrogen, such as a portion of hydrogen effluent 44 from the NREF 40, or supplemental hydrogen from an external hydrogen source inside or outside the battery limits of the refinery. The hydrogen may be passed directly to the hydroprocessing reactor 80 through hydrogen stream 82 or may be combined with the vacuum residue 66 upstream of the hydroprocessing reactor 80.

The hydroprocessing reactor 80 may be operable to remove one or a plurality of impurities, such as metals, sulfur compounds, nitrogen compounds, or combinations of these, from the vacuum residue 66. Additionally or alternatively, the hydroprocessing reactor 80 may include a hydrocracking catalyst and may be operable to cause at least a portion of the vacuum residue, under hydrocracking reactions, to produce the hydroprocessed effluent 84. The hydroprocessing reactor 80 may include one or a plurality of hydroprocessing zones, such as one or more of a hydrodemetalization (HDM) reaction zone, a transition zone, a hydrodesulfurization (HDS) zone, a hydrodenitrogenation (HDN) zone, a hydrocracking zone, or combinations of these reaction zones. Each of the plurality of reaction zones may be disposed in a single reactor or in multiple reactors in series. Each reaction zone may include a catalyst bed comprising a hydroprocessing catalyst, such as but not limited to a hydrodenitrogenation catalyst, a hydrodemetalization catalyst, a hydrodesulfurization catalyst, a hydrocracking catalyst, or combinations of these. The hydroprocessing reactor 80 may include any type of reactor suitable for contacting the vacuum residue 66 with hydrogen in the presence of the hydroprocessing catalysts. Suitable reactors may include, but are not limited to, fixed bed reactors, moving bed reactors, fluidized bed reactors, slurry-bed reactors, other types of reactors, or combinations of reactors. In embodiments, the hydroprocessing reactor 80 may include one or more fixed bed reactors, which may be operated in downflow, upflow, or horizontal flow configurations.

The hydroprocessing catalysts in the hydroprocessing unit 80 may include one or more metals selected from the metallic elements in Groups 5, 6, 8, 9, or 10 of IUPAC periodic table, such as, but not limited to, molybdenum, nickel, cobalt, tungsten, or combinations of these. The metals of the hydroprocessing catalyst may be present as pure metals, metal oxides, metal sulfides, or combinations of these. The metals, metal oxides, or metal sulfides of the hydrotreating catalysts may be supported on a support, such as a silica, alumina, titania or a combination of these. The support material may include, but is not limited to, gamma-alumina or silica/alumina extrudates, spheres, cylinders, beads, pellets, and combinations thereof. In one or more embodiments, the hydrotreating catalysts may include nickel and molybdenum on an alumina support or cobalt and molybdenum on an alumina support.

The hydroprocessing reactor 80 may be operated at a hydroprocessing temperature of from 350° C. to 500° C., such as from 380° C. to 475° C., or even from 400° C. to 450° C. The hydroprocessing reactor 80 may be operated at a hydroprocessing pressure of from 100 bar (10,000 kPa) to 250 bar (25,000 kPa), such as from 130 bar (13,000 kPa) to 200 bar (20,000 kPa), or even from 150 bar (15,000 kPa) to 180 bar (18,000 kPa). The hydroprocessing reactor 80 may operate with an LHSV of from 0.1 per hour ($hr^{-1}$) to 5 $hr^{-1}$, such as from 0.25 $hr^{-1}$ to 2 $hr^{-1}$, or even from 0.5 $hr^{-1}$ to 1 $hr^{-1}$. The volume ratio (standard liter/liter, where standard liter refers to a liter volume of gas at standard temperature and pressure) of hydrogen 82 to oil may be from 1000:1 to 5000:1, from 1000:1 to 2000:1, or even from 1000:1 to 1500:1, where the oil is the residue introduced to the hydroprocessing reactor 80, which can include the atmospheric residue 18, the vacuum residue 66, or a combination of these.

Referring again to FIG. 1, the hydroprocessed effluent separation system 90 may be in fluid communication with the hydroprocessing reactor 80 and operable to receive the hydroprocessed effluent 84 from the hydroprocessing reactor 80. The hydroprocessed effluent separation system 90 may be operable to separate the hydroprocessed effluent 84 into a fuel oil effluent 94 and at least one distillate effluent 93, a light gas effluent 92, or both. The light gas effluent may include light gases having boiling point temperatures less than 36° C. The at least one distillate effluent 93 may include naphtha (boiling point temperatures of 36° C.-180° C.), mid-distillates (boiling point temperatures from 180° C.-370° C.), hydrocarbons boiling in the vacuum gas oil range (boiling point temperatures of from 370° C.-565° C.), or combinations of these. The fuel oil effluent may include constituents having boiling point temperatures greater than 565° C.

As previously discussed, the atmospheric residue 18 and vacuum residue 66 can include core materials, such as asphaltene compounds (asphaltenes), dispersed in lower polarity compounds present in the residue. As previously discussed, the atmospheric residue 18, the vacuum residue 66, or both can include at least 1 wt. % asphaltene compounds. Intermediate polarity materials, usually referred to as resins, can associate with the polar core materials to maintain a homogeneous mixture of the components. Asphaltene compounds are organic heterocyclic macromolecules which occur in crude oils. Asphaltenes are stabilized in the crude oil by maltenes or specifically resins that are chemically compatible with the asphaltenes but that have lesser molecular weight compared to the asphaltenes. Maltenes may be composed of resins, aromatic compounds, saturated compounds, or combinations of these. Polar portions or regions of the maltenes or resins surround the asphaltene compounds while non-polar regions are attracted to the oil phase. However, changes in pressure, temperature, or concentration of the crude oil can alter the stability of the dispersion and increase the tendency of the asphaltene compounds to agglomerate into larger particles. As these asphaltene agglomerates grow, so does their tendency to precipitate out of solution.

During hydroprocessing of the vacuum residue 66 or atmospheric residue 18 in the hydroprocessing reactor 80 of the RHPU 70, the severe conditions in the hydroprocessing reactor 80 may cause the oil fractions, such as maltenes and resins that stabilize and solubilize asphaltene compounds and other coke precursors to react and breakdown, which can destroy the stabilization system for the asphaltenes. Destruction of the stabilization system for the asphaltenes and other coke precursors in the hydroprocessing reactor 80 may result in precipitation of asphaltenes and other coke precursors from the hydroprocessed effluent 84. The precipitated asphaltenes and other coke precursors may deposit on hydroprocessing catalysts, causing deactivation of the hydroprocessing catalysts. Deactivation of the hydroprocessing catalysts caused by deposition of asphaltenes and coke on the hydroprocessing catalyst may reduce the yield of products and intermediates from the process and may cause problems with catalyst life and smooth operation of the hydroprocessing reactor 80. Even at small concentrations, such as less than 0.5 weight percent, asphaltenes and other coke precursors can cause significant deactivation of hydroprocessing catalysts. Further, sediment formed during hydroprocessing may settle and deposit in such apparatuses as the hydroprocessing reactor 80, the hydroprocessed effluent separation system 90, heat exchangers upstream or downstream of the hydroprocessed effluent separation system 90, or other downstream process equipment. This sediment formation may affect the overall economy of the system since the reactor system cannot reach higher conversions.

In some conventional systems, the asphaltene compounds are removed from the feed to the hydroprocessing unit upstream before subjecting the feed to hydroprocess. However, removal of asphaltenes from the hydroprocessing feed can be capital intensive and may not remove all of the asphaltenes from the vacuum residue 66 or atmospheric residue 18. As discussed previously, even small concentrations of asphaltenes less than 0.5 wt. % can lead to precipitation and sedimentation under the reaction conditions in the hydroprocessing reactor 80 of the RHPU 70.

In the present disclosure, precipitation of asphaltene compounds and sedimentation are reduced by passing at least a portion of the aromatic bottoms stream 56 from the ARC 50 to the RHPU 70. The C9+ aromatic compounds in the aromatic bottoms stream 56 from the ARC 50 can increase the solvency of the hydrocarbon streams of the RHPU 70 and increase the solubility of the asphaltene compounds during and after hydroprocessing of the vacuum residue 66 or atmospheric residue 18 in the hydroprocessing reactor 80 of the RHPU 70, which may reduce or prevent precipitation of asphaltenes and sedimentation in the hydroprocessing reactor 80, the hydroprocessed effluent separation system 90, heat transfer units, or other process equipment downstream of the RHPU 70. Additionally, passing at least a portion of the aromatic bottoms stream 56 from the ARC 50 to the RHPU 70 may also increase conversion of C9+ aromatic compounds from the aromatic bottoms stream 56 to greater value products or intermediates compared to passing the aromatic bottoms stream 56 out of the system 100 as a byproduct or low-value stream.

The inventors of the present disclosure discovered that the aromatic bottoms stream 56 produced by the ARC 50 possesses a high solubility factor compared with the straight run petroleum fractions. The Hildebrand solubility scale (Joel H. Hildebrand, Journal of Paint Technology, Vol. 39, No. 505, February 1967) is one of the oldest and widely accepted scales used in the industry to scale the solvents. The Hildebrand solubility parameter is derived from the cohesive energy density of the solvent, which in turn is derived from the heat of vaporization. The basic theory behind the Hildebrand solubility parameter will now be briefly described. When a liquid is heated to its boiling point, energy is added to the liquid, resulting in an increase in the temperature of the liquid. Once the liquid reaches its boiling point, however, the further addition of heat does not cause a further increase in temperature. The energy that is added is entirely used to separate the molecules of the liquid and boil them away into a gas. If the amount of energy (in calories) was added from the onset of boiling to the point when all the liquid has boiled away is measured, the amount of energy required can provide a direct indication of the amount of energy required to separate the liquid into a gas, and thus the amount of van der Waals forces that held the molecules of the liquid together. The amount of heat that has to be added to separate the molecules may be independent of the boiling point temperature. A liquid with a low boiling point temperature may require considerable energy to vaporize, while a liquid with a higher boiling point temperature may vaporize quite readily, or vice versa. The energy required to vaporize the liquid is called the heat of vaporization. From the heat of vaporization, in calories per cubic centimeter of liquid, we can derive the cohesive energy density by Equation 1 (EQU. 1).

$$c = \frac{(\Delta H - R \times T)}{V_m} \quad \text{EQU. 1}$$

In EQU. 1, c is the cohesive energy density, $\Delta H$ is the heat of vaporization, R is the gas constant, T is the temperature, and $V_m$ is the molar volume. Joel H. Hildebrand proposed the solubility parameter as the square root of the cohesive energy density as a numerical value indicating the solvency behavior of a specific solvent. The equation for the Hildebrand solubility parameter is provided in Equation 2 (EQU. 2).

$$\delta = \left(\frac{(\Delta H - R \times T)}{V_m}\right)^{1/2} \quad \text{EQU. 2}$$

In EQU. 2, $\delta$ is the Hildebrand solubility parameter, which may be in units of calories$^{1/2}$ when metric units are used in EQU. 2 or in megapascal$^{1/2}$ (MPa$^{1/2}$) when SI units are used in EQU. 2.

Since the Hildebrand solubility parameters are not readily available in the literature for various refinery streams, the inventors of the present disclosure calculated the solubility parameters for the kerosene, light gas oil, and aromatic bottoms streams as shown in Table 2. Table 2 also includes typical Hildebrand solubility parameters for common individual solvents.

TABLE 2

| Hildebrand Solubility Parameters (HSB) for Selected Solvents and Refinery Streams | |
|---|---|
| Solvent | $\delta$ (MPa$^{1/2}$) |
| Heptane | 15.3 |
| n-Dodecane | 16.0 |
| Benzene | 18.7 |
| Kerosene* | 16.3 |
| Light gas oil* | 15.7 |
| Aromatic Bottoms Stream (full range)** | 20.7 |
| Aromatic Bottoms Stream (bp ≥ 180° C.)** | 21.2 |

*HSB calculated from EQU. 2 using known or measured properties
**HSB estimated using EQU. 2 based on estimated properties As shown in Table 2, heptane, a paraffinic solvent with a carbon number of 7, has a Hildebrand solubility parameter (HSB) of 15.3, and n-dodecane, a paraffinic solvent with carbon number of 12, has an HSB value of 16. Benzene, a mono-aromatic solvent with a carbon number of 6, has an HSB value of 18.7. The HSB of 16.3 for kerosene is indicative of kerosene having both paraffinic and aromatic components. Light gas oil has an HSB less than kerosene, which indicates that the light gas oil may be more paraffinic in nature compared with the kerosene fraction, based on the comparison of HSB. The aromatics bottoms stream 56, whether its full range stream as-received from the ARC 50, or the fraction of the aromatic bottoms stream 56 boiling at or above 180° C., exhibits high estimated HSB values in the range 20.7-21.2. Based on the estimated HSB values for the aromatic bottoms stream 56 from the ARC 50, the inventors of the present disclosure found that the aromatic bottoms stream 56 obtained from the ARC 50 can be a powerful solvent to solubilize asphaltene compounds and reduce or dissipate the sediment in the RHPU 70. In addition, the aromatic bottoms stream 56 can be processed in the RHPU 70 to produce high quality fuels, such as gasoline, which may increase the yield of greater value products and intermediates from the system 100.

Figure 3:
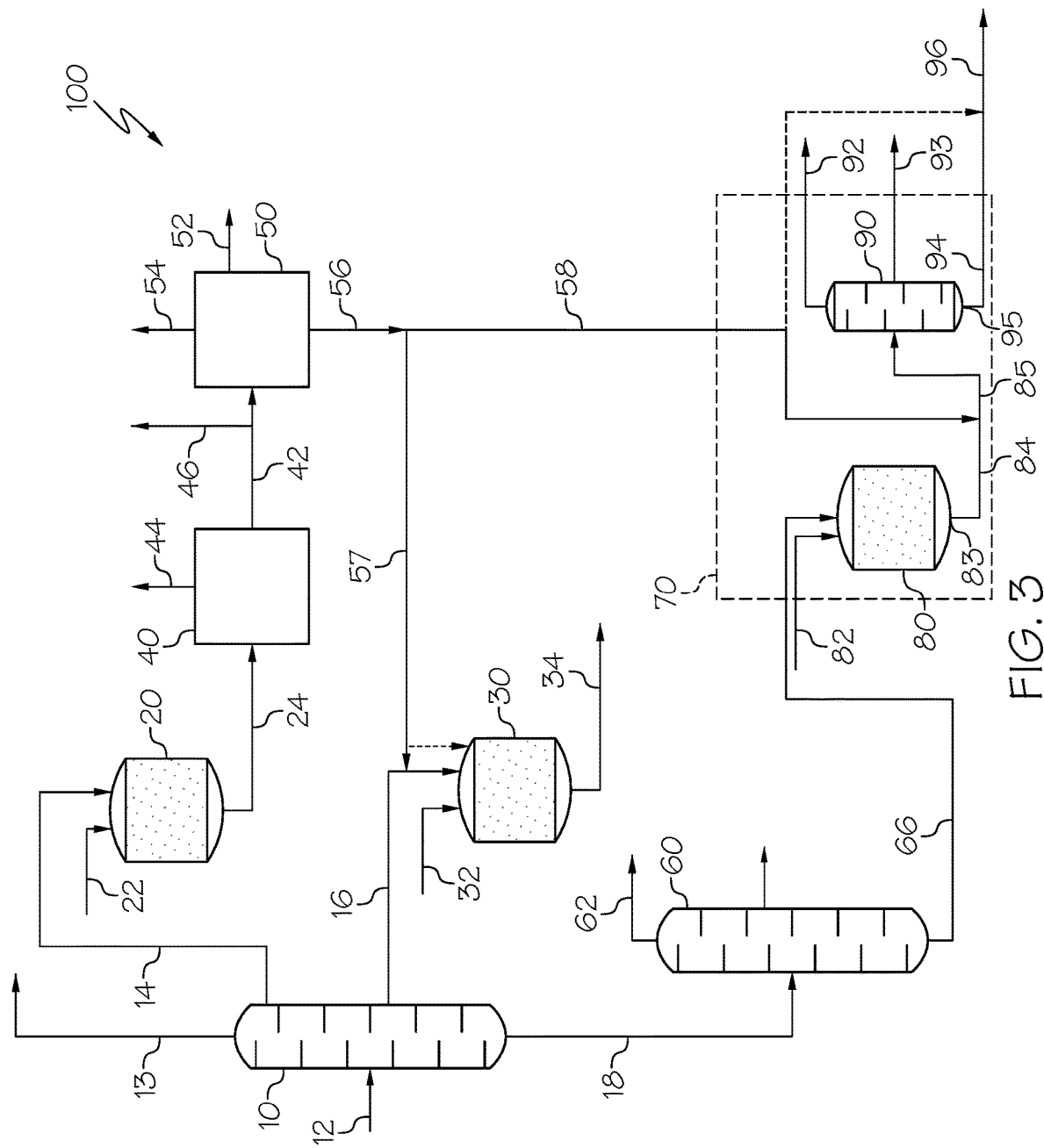
FIG. 3 schematically depicts a generalized flow diagram of another embodiment of a system for separation and upgrading crude oil, according to one or more embodiments shown and described in this disclosure.

Referring again to FIG. 1, the system 100 may include an aromatic bottoms transfer line 58 extending from the ARC 50 to the RHPU 70. The aromatic bottoms transfer line 58 may provide fluid communication between the aromatic bottoms stream 56 from the ARC 50 and the RHPU 70. The aromatic bottoms transfer line 58 may be operable to transfer at least a portion of the aromatic bottoms stream 56 from the ARC 50 to the RHPU 70, where the portion of the aromatic bottoms stream passed to the RHPU 70 can increase the solvency of the hydrocarbon streams, such as the hydroprocessed effluent 84, fuel oil effluent 94, or both, of the RHPU 70 to increase solubility of asphaltenes in the hydroprocessing reactor 80 of the RHPU 70, the hydroprocessed effluent 84, the fuel oil effluent 94, or combinations of these, which may reduce or prevent sedimentation. Referring to FIGS. 1 and 3, the aromatic bottoms transfer line 58 may be operable to transfer the portion of the aromatic bottoms stream 56 to the hydroprocessing reactor 80 (FIG. 1), a hydroprocessing reactor outlet 83 of the hydroprocessing reactor 80 (FIG. 3), a fuel oil effluent outlet 95 of the hydroprocessed effluent separation system 90 (FIG. 3), or combinations of these.

The portion of the aromatic bottoms stream passed to the RHPU 70 may include C9+ aromatic compounds (aromatic compounds having greater than 9 carbon atoms). The portion of the aromatic bottom stream passed to the RHPU 70 may comprise at least 50 weight percent C9+ aromatic compounds based on the total weight of the portion of the aromatic bottoms stream. The portion of the aromatic bottom stream passed to the RHPU 70 may include C11+ aromatic compounds (aromatic compounds having greater than 11 carbon atoms). The portion of the aromatic bottoms stream passed to the RHPU 70 may include greater than 50 weight percent constituents having atmospheric boiling point temperatures greater than or equal to 150° C., or even greater than or equal to 180° C.

Referring again to FIG. 1, the aromatic bottoms transfer line 58 may be operable to pass the portion of the aromatic bottom stream 56 to the hydroprocessing reactor 80 of the RHPU 70. The aromatic bottoms transfer line 58 may be in fluid communication with the aromatic bottoms stream 56 and with the hydroprocessing reactor 80 and may be operable to pass the portion of the aromatic bottoms stream directly to the hydroprocessing reactor 80, such as to an inlet of the hydroprocessing reactor 80. Additionally or alternatively, the aromatic bottoms transfer line 58 may be in fluid communication with the vacuum residue 66 upstream of the hydroprocessing reactor 80. The portion of the aromatic bottoms stream may be combined with the vacuum residue 66 upstream of the hydroprocessing reactor 80 to form a combined residue inlet stream or may be passed directly to the hydroprocessing reactor 80.

When the portion of the aromatic bottoms stream 56 is added to the hydroprocessing reactor 80 or combined with the vacuum residue 66 upstream of the hydroprocessing reactor 80, the amount of aromatic bottoms stream 56 may be from 0.1% to 50%, from 2% to 30%, or from 1% to 10% by volume of the vacuum residue 66. In other words, the volume of the aromatic bottoms stream divided by the volume of the vacuum residue 66 may be from 1% to 50%, from 2% to 30%, or from 1% to 10%.

In the hydroprocessing reactor 80, the vacuum residue 66 and the portion of the aromatic bottoms stream from aromatic bottoms transfer line 58 may be contacted with hydrogen in the presence of the hydroprocessing catalyst(s) to produce the hydroprocessed effluent 84. The contacting may cause at least a portion of the aromatic compounds from the aromatic bottoms stream to undergo reactions to produce further valuable petrochemical or fuel products or intermediates. The remaining C9+ aromatic compounds from the aromatic bottoms stream may increase the solubility of asphaltene compounds, which may reduce or prevent precipitation of the asphaltene compounds in the hydroprocessing reactor 80, the hydroprocessed effluent 84, the hydroprocessed effluent separation system 90, the fuel oil effluent 94, other downstream process equipment, or combinations of these. The increased solubility of asphaltenes provided by the portion of the aromatic bottoms stream may reduce or prevent sedimentation in the hydroprocessing reactor 80, the hydroprocessed effluent 84, the hydroprocessed effluent separation system 90, the fuel oil effluent 94, other downstream process equipment, or combinations of these.

Referring now to FIG. 3, the aromatic bottoms transfer line 58 may be in fluid communication with the hydroprocessed effluent 84, the fuel oil effluent 94, or both. The aromatic bottoms transfer line 58 may be operable to pass the portion of the aromatic bottoms stream 56 from the ARC 50 to the hydroprocessed effluent 84, the fuel oil effluent 94, or both. The portion of the aromatic bottoms stream from aromatic bottoms transfer line 58 may be combined with the hydroprocessed effluent 84 downstream of the hydroprocessing reactor 80 and upstream of the hydroprocessed effluent separation system 90 to produce a modified hydroprocessed effluent 85 that may be passed to the hydroprocessed effluent separation system 90. The aromatic bottoms transfer line 58 may be in direct fluid communication with a hydroprocessed effluent outlet 83 of the hydroprocessing reactor 80 to combine the portion of the aromatic bottoms stream with the hydroprocessed effluent 84. The hydroprocessed effluent outlet 83 may refer to the physical outlet of the hydroprocessing reactor 80 through which the hydroprocessed effluent 84 exits the reactor. Direct fluid communication between the aromatic bottoms transfer line 58 and the hydroprocessed effluent outlet 83 may enable the aromatic bottoms stream to be combined with the hydroprocessed effluent 84 before the hydroprocessed effluent 84 is passed through any ancillary process equipment, such as heat exchangers, valves, pumps, compressors, instruments, or other equipment. This may reduce or prevent sedimentation in this ancillary process equipment that may be immediately downstream of the hydroprocessing reactor 80. The aromatic bottoms stream, by way of the aromatic bottoms transfer line 58, can also be combined with the hydroprocessed effluent 84 in the hydroprocessed effluent separation system 90. In embodiments, the aromatic bottoms transfer line 58 may be in fluid communication with the hydroprocessed effluent separation system 90 to pass the portion of the aromatic bottoms stream 56 to the hydroprocessed effluent separation system 90.

The portion of the aromatic bottoms stream combined with the hydroprocessed effluent 84 to form the modified hydroprocessed effluent 85 may increase the solvency of the modified hydroprocessed effluent 85 to increase the solubility of the asphaltenes, which may reduce or prevent precipitation of asphaltenes and sedimentation in the modified hydroprocessed effluent 85, the hydroprocessed effluent separation system 90, the fuel oil effluent 94, downstream processing equipment, or combinations of these. When the portion of the aromatic bottoms stream 56 is combined with the hydroprocessed effluent 84, the amount of aromatic bottoms stream 56 may be from 0.1% to 50%, from 1% to 30%, or from 1% to 10% by volume of the hydroprocessed effluent 84. In other words, the volume of the aromatic bottoms stream divided by the volume of the hydroprocessed effluent 84 may be from 0.1% to 50%, from 1% to 30%, or from 1% to 10%.

Referring still to FIG. 3, the aromatic bottoms transfer line 58 may be operable to pass all or part of the portion of the aromatic bottoms stream to the fuel oil effluent 94 downstream of the hydroprocessed effluent separation system 90. The aromatic bottoms transfer line 58 may be in direct fluid communication with a fuel oil effluent outlet 95 of the hydroprocessed effluent separation system 90 to combine the portion of the aromatic bottoms stream from the aromatic bottoms transfer line 58 with the fuel oil effluent 94 to produce a modified fuel oil effluent 96. The fuel oil effluent outlet 95 may refer to the physical outlet of the hydroprocessed effluent separation system 90 through which the fuel oil effluent 94 exits the unit. Direct fluid communication between the aromatic bottoms transfer line 58 and the fuel oil effluent outlet 95 may enable the aromatic bottoms stream to be combined with the fuel oil effluent 94 before the fuel oil effluent 94 is passed through any ancillary process equipment, such as heat exchangers, valves, pumps, compressors, instruments, or other equipment. This may reduce or prevent sedimentation in this ancillary process equipment that may be immediately downstream of the hydroprocessed effluent separation system 90.

The portion of the aromatic bottoms stream combined with the fuel oil effluent 94 may increase the solvency of the modified fuel oil effluent 96 compared to the fuel oil effluent 94, which may increase the solubility of the asphaltene compounds in the modified fuel oil effluent 96. The increased solubility of asphaltene compounds may reduce or prevent precipitation of asphaltenes and sedimentation in the modified fuel oil effluent 96, downstream processing equipment, or both. In embodiments, the aromatic bottoms transfer line 58 may be in fluid communication with a combination of two or more of the vacuum residue 66, the hydroprocessing reactor 80, the hydroprocessed effluent 84, the fuel oil effluent 94, or combinations of these. When the portion of the aromatic bottoms stream 56 is combined with the fuel oil effluent 94, the amount of aromatic bottoms stream 56 may be from 0.1% to 50%, from 1% to 30%, or from 1% to 10% by volume of the fuel oil effluent 94. In other words, the volume of the aromatic bottoms stream divided by the volume of the fuel oil effluent 94 may be from 0.1% to 50%, from 1% to 30%, or from 1% to 10%.

Passing the portion of the aromatic bottoms stream back to the RHPU 70 may improve the solubility of asphaltenes in the RHPU 70, which may reduce or eliminate the need for asphaltene removal systems, such as deasphalting units, upstream of the RHPU 70. In embodiments, the system 100 may not include a deasphalting unit upstream of the RHPU 70, such as between the distillation unit (ADU 10, VDU 60, or both) and the RHPU 70.

Figure 4:
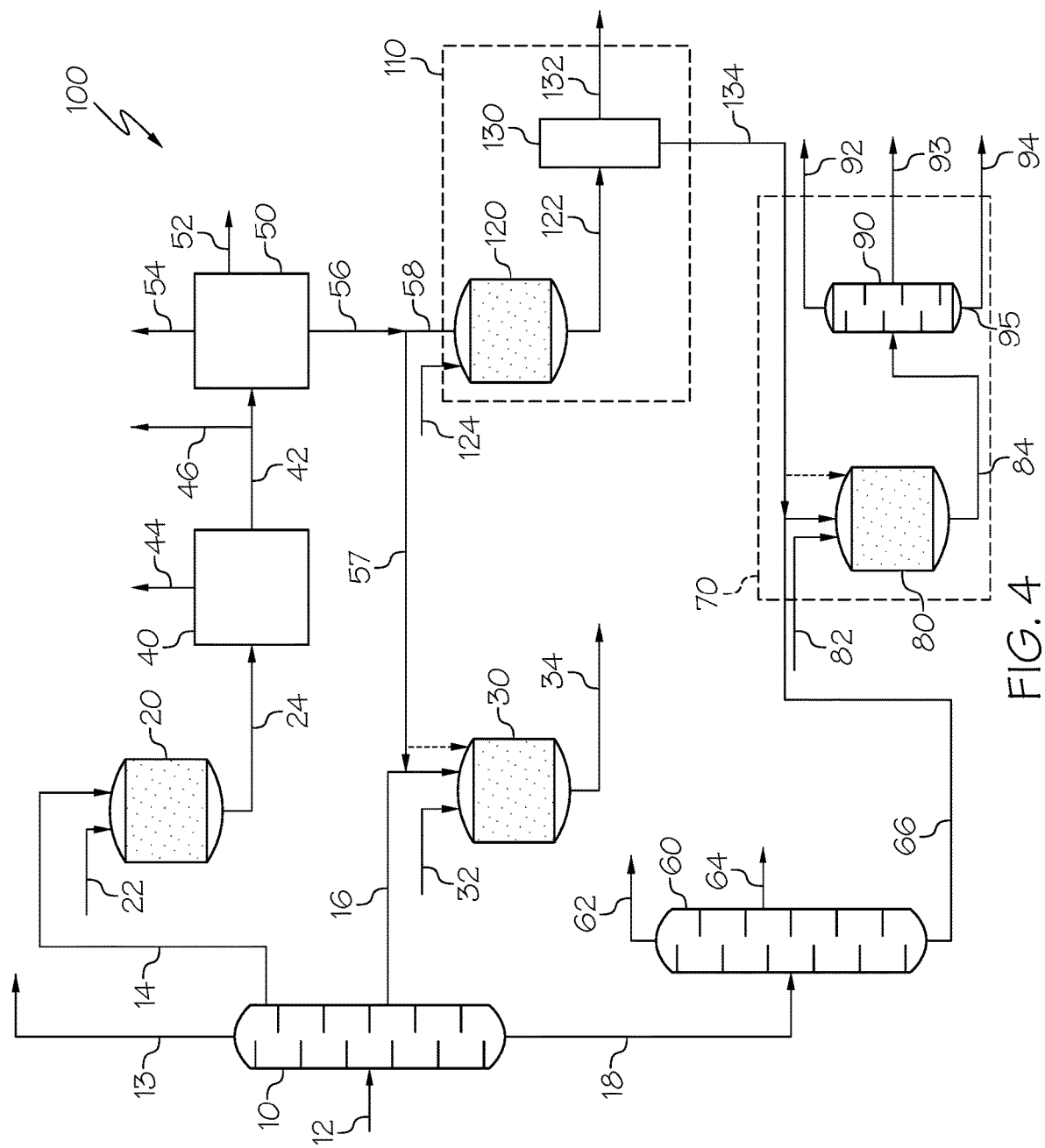
FIG. 4 schematically depicts a generalized flow diagram of another embodiment of a system for separating and upgrading crude oil, according to one or more embodiments shown and described in this disclosure.

Referring now to FIG. 4, the system 100 may include a hydrodearylation unit (HAD) 110 disposed downstream of the ARC 50. The HAD 110 may be in fluid communication with the ARC 50 through the aromatic bottoms transfer line 58 and operable to receive at least a portion of the aromatic bottoms stream 56 from the ARC 50. The HAD 110 may hydrodearylate at least a portion of the aromatic bottoms stream from the aromatic bottoms transfer line 58 to produce at least a monoaromatics stream 132 and a hydrodearylated bottoms stream 134. As used in this disclosure, the term "hydrodearylation" may refer to a process for cleaving of the alkyl bridge of non-condensed alkyl-bridged multi-aromatics or heavy alkyl aromatic compounds to form alkyl monoaromatics, in the presence of a hydrodearylation catalyst and hydrogen. The HAD 110 may be in fluid communication with the RHPU 70 to pass at least a portion of the hydrodearylated bottoms stream 134 to the RHPU 70. The hydrodearylated bottoms stream 134 passed to the RHPU 70 may include C11+ aromatic compounds and compounds boiling at temperatures greater than or equal to 180° C. The components of the hydrodearylated bottoms stream 134 passed to the RHPU 70 may increase the solubility of asphaltene compounds in the vacuum residue 66, the hydroprocessing reactor 80, the hydroprocessed effluent 84, the fuel oil effluent 94, or combinations of these to reduce or prevent precipitation of asphaltenes and sedimentation.

The HAD 110 may include a hydrodearylation reactor 120 and a hydrodearylated effluent separation system 130 disposed downstream of the hydrodearylation reactor 120. The hydrodearylation reactor 120 may be disposed downstream of the ARC 50 and may be in fluid communication with the ARC 50. The aromatic bottoms transfer line 58 may transfer at least a portion of the aromatic bottoms stream 56 from the ARC 50 directly to an inlet of the hydrodearylation reactor 120. As previously described, at least a second portion of the aromatic bottoms stream 56 may be diverted upstream of the hydrodearylation reactor 120 and passed to the DHT 30 through aromatic bottoms DHT transfer line 57 without first passing to and being processed by the HAD 110.

The hydrodearylation reactor 120 may be operable to contact at least a portion of the aromatic bottoms stream with hydrogen in the presence of a hydrodearylation catalyst to produce a hydrodearylated effluent 122. The hydrogen may be passed to the hydrodearylation reactor 120 in hydrogen stream 124. The hydrogen stream 124 may include recycled hydrogen, such as a portion of hydrogen effluent 44 from the NREF 40, or supplemental hydrogen from an external hydrogen source inside or outside the battery limits of the refinery. The hydrogen may be passed directly to the hydrodearylation reactor 120 or may be combined with the portion of the aromatic bottoms stream upstream of the hydrodearylation reactor 120.

The hydrodearylation reactor 120 may include any type of reactor suitable for contacting the portion of the aromatic bottoms stream with hydrogen in the presence of the hydrodearylation catalysts. Suitable reactors may include, but are not limited to, fixed bed reactors, moving bed reactors, fluidized bed reactors, slurry-bed, other types of reactors, or combinations of reactors. In embodiments, the hydrodearylation reactor 120 may include one or more fixed bed reactors, which may be operated in downflow, upflow, or horizontal flow configurations.

The hydrodearylation catalyst in the hydrodearylation reactor 120 can include a support made of one or more of silica, alumina, titania, and a combination thereof. The hydrodearylation catalyst in the hydrodearylation reactor 120 can further include an acidic component being at least one member of the group consisting of amorphous silica-alumina, zeolite, and combinations thereof. The zeolite can be one or more of or derived from FAU, *BEA, MOR, MFI, or MWW framework types, wherein each of these codes correspond to a zeolite structure present in the database of zeolite structures as maintained by the Structure Commission of the International Zeolite Association. The hydrodearylation catalyst in the hydrodearylation reactor 120 can include one or more metals from Groups 6-10 of the IUPAC periodic table. The hydrodearylation catalyst may include a metal selected from the group consisting of iron, cobalt, nickel, molybdenum, tungsten, and combinations thereof. The IUPAC Group 8-10 metals can be present in the hydrodearylation catalyst in an amount ranging from 2 to 20 percent by weight of the hydrodearylation catalyst and the IUPAC Group 6 metal can be present in the hydrodearylation catalyst in an amount ranging from 1 to 25 percent by weight of the hydrodearylation catalyst.

The hydrodearylation reactor 120 may contact the portion of the aromatic bottoms with hydrogen in the presence of the hydrodearylation catalyst at operating conditions sufficient to cause at least a portion of the hydrocarbons in the aromatic bottoms stream to undergo hydrodearylation to produce a hydrodearylated effluent. The hydrodearylation reactor 120 may be operated at an operating temperature in the range of from 200° C. to 450° C., or from 250° C. to 450° C. The hydrodearylation reactor 120 may be operated at a hydrogen partial pressure of from 500 kilopascals (kPA, equal to 5 bar gauge, where 1 bar equals 100 kPa) to 10,000 kPa (equal to 100 bar gauge). Contacting the aromatic bottoms stream with hydrogen in the presence of the hydrodearylation catalyst at the operating conditions of the hydrodearylation reactor 120 may cause at least a portion of the non-condensed alkyl-bridged multi-aromatics compounds or heavy alkyl aromatic compounds to undergo hydrodearylation reactions to cleave at least a portion of the alkyl bridges of these compounds to form alkyl mono-aromatic compounds.

Referring again to FIG. 4, the hydrodearylated effluent 122 may be passed from the hydrodearylation reactor 120 to the hydrodearylated effluent separation system 130. The hydrodearylated effluent separation system 130 may be in fluid communication with the hydrodearylation reactor 120 so that the hydrodearylated effluent 122 may be passed directly to the hydrodearylated effluent separation system 130. The hydrodearylated effluent separation system 130 may include one or a plurality of separation units. The hydrodearylated effluent separation system 130 may be operable to separate the hydrodearylated effluent 122 into a monoaromatics effluent 132 and a hydrodearylated bottoms effluent 134. The monoaromatics effluent 132 may include at least 50% at least 60%, at least 70%, at least 80%, or at least 90% by weight of the monoaromatic and alkyl monoaromatic compounds from the hydrodearylated effluent 122. The monoaromatics effluent 132 may include at least 80%, at least 90%, at least 95%, at least 98%, or even at least 99% of the aromatic compounds boiling below 180° C. from the hydrodearylated effluent 122. The hydrodearylated bottoms effluent 134 may include C9+ aromatic compounds. The hydrodearylated bottoms effluent 134 may include C11+ aromatic compounds. The hydrodearylated bottoms effluent 134 may include at least at least 90%, at least 95%, at least 98%, or even at least 99% of the C11+ aromatic compounds from the hydrodearylated effluent 122. The hydrodearylated bottoms effluent 134 may include at least 80%, at least 90%, at least 95%, at least 98%, or even at least 99% of the aromatic compounds boiling at temperatures greater than or equal to 180° C. from the hydrodearylated effluent 122.

Referring again to FIG. 4, at least a portion of the hydrodearylated bottoms stream 134 may be passed to the RHPU 70 to solubilize asphaltene compounds in the RHPU. As shown in FIG. 4, the hydroprocessing reactor 80 of the RHPU 70 may be in fluid communication with the HAD 110 and may be operable to receive at least a portion of the hydrodearylated bottoms stream 134. Additionally or alternatively, the HAD 110 may be in fluid communication with the vacuum residue 66 upstream of the hydroprocessing reactor 80. The portion of the hydrodearylated bottoms stream 134 may be combined with the vacuum residue 66 upstream of the hydroprocessing reactor 80 to form a combined residue inlet stream or may be passed directly to the hydroprocessing reactor 80. When the portion of the hydrodearylated bottoms stream 134 is combined with the vacuum residue 66 or passed directly to the hydroprocessing reactor 80, the amount of hydrodearylated bottoms stream 134 may be from 0.1% to 50%, from 1% to 30%, or from 1% to 10% by volume of the vacuum residue. In other words, the volume of the hydrodearylated bottoms stream 134 divided by the volume of the vacuum residue 66 may be from 0.1% to 50%, from 1% to 30%, or from 1% to 10%.

In the hydroprocessing reactor 80, the portion of the hydrodearylated bottoms stream 134 and the vacuum residue 66 may be contacted with hydrogen in the presence of the hydroprocessing catalyst(s) to produce the hydroprocessed effluent 84. The contacting may cause at least a portion of the aromatic compounds from the hydrodearylated bottoms stream 134 to undergo reactions to produce further valuable petrochemical or fuel products or intermediates. The remaining C11+ aromatic compounds from the hydrodearylated bottoms stream 134 may increase the solubility of asphaltene compounds from the vacuum residue 66, which may reduce or prevent precipitation of the asphaltenes in the hydroprocessing reactor 80, the hydroprocessed effluent 84, the hydroprocessed effluent separation system 90, the fuel oil effluent 94, other downstream process equipment, or combinations of these. The increased solubility of asphaltenes provided by the portion of the aromatic bottoms stream may reduce or prevent sedimentation in the hydroprocessing reactor 80, the hydroprocessed effluent 84, the hydroprocessed effluent separation system 90, the fuel oil effluent 94, other downstream process equipment, or combinations of these.

Figure 5:
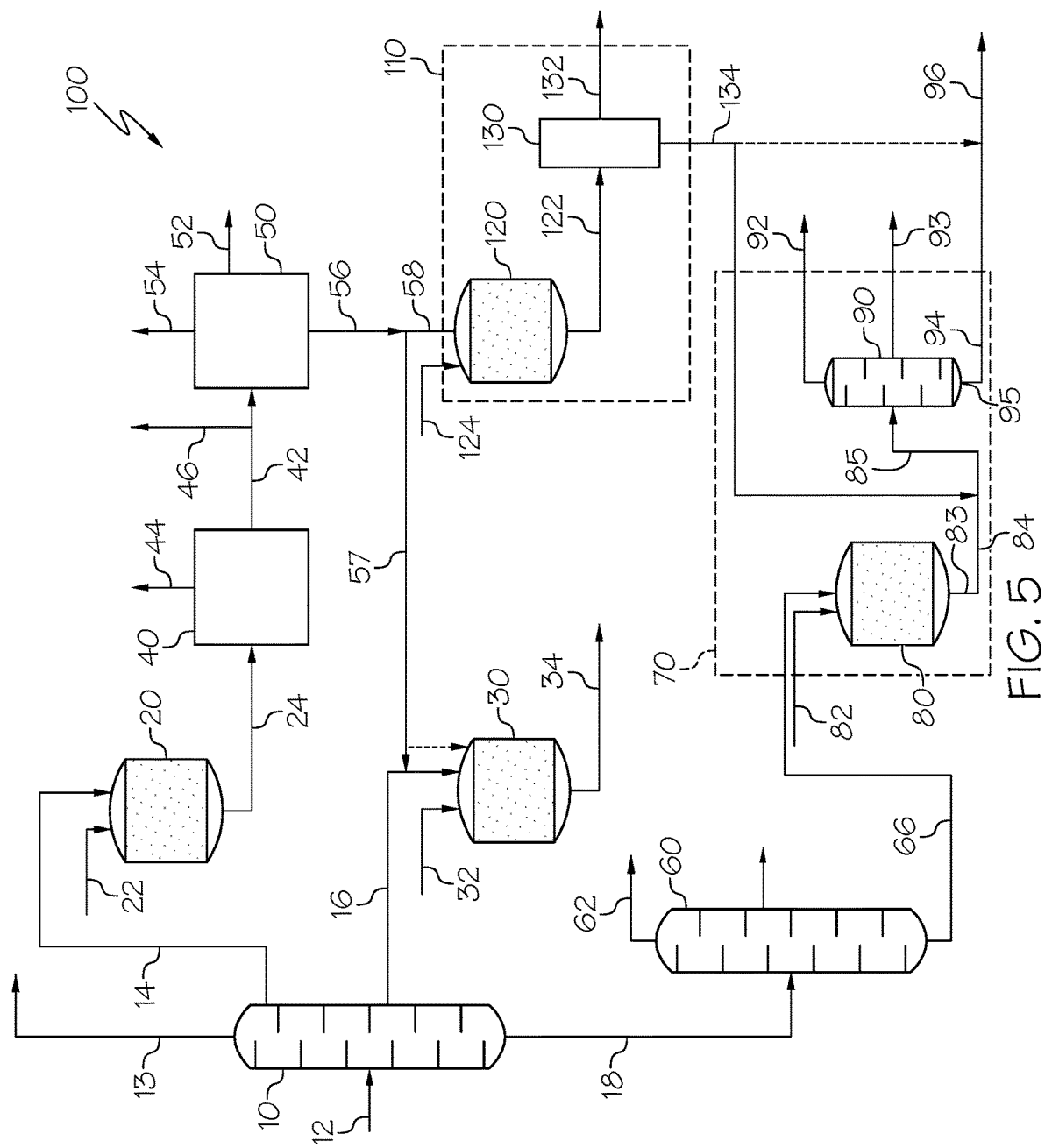
FIG. 5 schematically depicts a generalized flow diagram of another embodiment of a system for separating and upgrading crude oil, according to one or more embodiments shown and described in this disclosure.

Referring now to FIG. 5, additionally or alternatively, the HAD 110 may be in fluid communication with the hydroprocessed effluent 84, the fuel oil effluent 94, or both. The portion of the hydrodearylated bottoms stream 134 may be combined with the hydroprocessed effluent 84 downstream of the hydroprocessing reactor 80 and upstream of the hydroprocessed effluent separation system 90 to produce a modified hydroprocessed effluent 85 that may be passed to the hydroprocessed effluent separation system 90. The HAD 110 may be in direct fluid communication with the hydroprocessed effluent outlet 83 of the hydroprocessing reactor 80 to combine the portion of the hydrodearylated bottoms stream 134 with the hydroprocessed effluent 84. Direct fluid communication between the HAD 110 and the hydroprocessed effluent outlet 83 may enable the hydrodearylated bottoms stream 134 to be combined with the hydroprocessed effluent 84 before the hydroprocessed effluent 84 is passed through any ancillary process equipment, such as heat exchangers, valves, pumps, compressors, instruments, or other equipment. This may reduce or prevent sedimentation in this ancillary process equipment that may be immediately downstream of the hydroprocessing reactor 80. The hydrodearylated bottoms stream 134 can also be combined with the hydroprocessed effluent 84 in the hydroprocessed effluent separation system 90. In embodiments, the HAD 110 may be in fluid communication with the hydroprocessed effluent separation system 90 to pass the portion of the hydrodearylated bottoms stream 134 to the hydroprocessed effluent separation system 90.

The portion of the hydrodearylated bottoms stream 134 combined with the hydroprocessed effluent 84 to form the modified hydroprocessed effluent 85 may increase the solubility of the asphaltenes in the hydroprocessed effluent 85, which may reduce or prevent precipitation of asphaltenes and sedimentation in the modified hydroprocessed effluent 85, the hydroprocessed effluent separation system 90, the fuel oil effluent 94, downstream processing equipment, or combinations of these. When the portion of the hydrodearylated bottoms stream 134 is combined with the hydroprocessed effluent 84, the amount of the hydrodearylated bottoms stream 134 may be from 0.1% to 50%, from 1% to 30%, or from 1% to 10% by volume of the hydroprocessed effluent 84. In other words, the volume of the hydrodearylated bottoms stream 134 divided by the volume of the hydroprocessed effluent 84 may be from 0.1% to 50%, from 1% to 30%, or from 1% to 10%.

Referring still to FIG. 5, the all or a portion of the hydrodearylated bottoms stream 134 may be passed to the fuel oil effluent 94 downstream of the hydroprocessed effluent separation system 90. The HAD 110 may be in direct fluid communication with the fuel oil effluent outlet 95 of the hydroprocessed effluent separation system 90 to combine the portion of the hydrodearylated bottoms stream 134 with the fuel oil effluent 94 to produce a modified fuel oil effluent 96. Direct fluid communication between the HAD 110 and the fuel oil effluent outlet 95 may enable the hydrodearylated bottoms stream 134 to be combined with the fuel oil effluent 94 before the fuel oil effluent 94 is passed through any downstream process equipment, such as heat exchangers, valves, pumps, compressors, instruments, unit operations, or other equipment. This may reduce or prevent sedimentation in this process equipment downstream of the hydroprocessed effluent separation system 90.

The portion of the hydrodearylated bottoms stream 134 combined with the fuel oil effluent 94 may increase the solvency of the modified fuel oil effluent 96, which may increase the solubility of the asphaltenes in the modified fuel oil effluent 96. The increased solubility of asphaltenes may reduce or prevent precipitation of asphaltenes and sedimentation in the modified fuel oil effluent 96, downstream processing equipment, or both. In embodiments, the HAD 110 may be in fluid communication with a combination of two or more of the vacuum residue 66, the hydroprocessing reactor 80, the hydroprocessed effluent 84, the fuel oil effluent 94, or combinations of these, to pass the hydrodearylated bottoms effluent 110 to the RHPU 70. When the portion of the hydrodearylated bottoms stream 134 is combined with the fuel oil effluent 94, the amount of the hydrodearylated bottoms stream 134 may be from 0.1% to 50%, from 1% to 30%, or from 1% to 10% by volume of the fuel oil effluent 94. In other words, the volume of the hydrodearylated bottoms stream 134 divided by the volume of the fuel oil effluent may be from 0.1% to 50%, from 1% to 30%, or from 1% to 10%.

Figure 6:
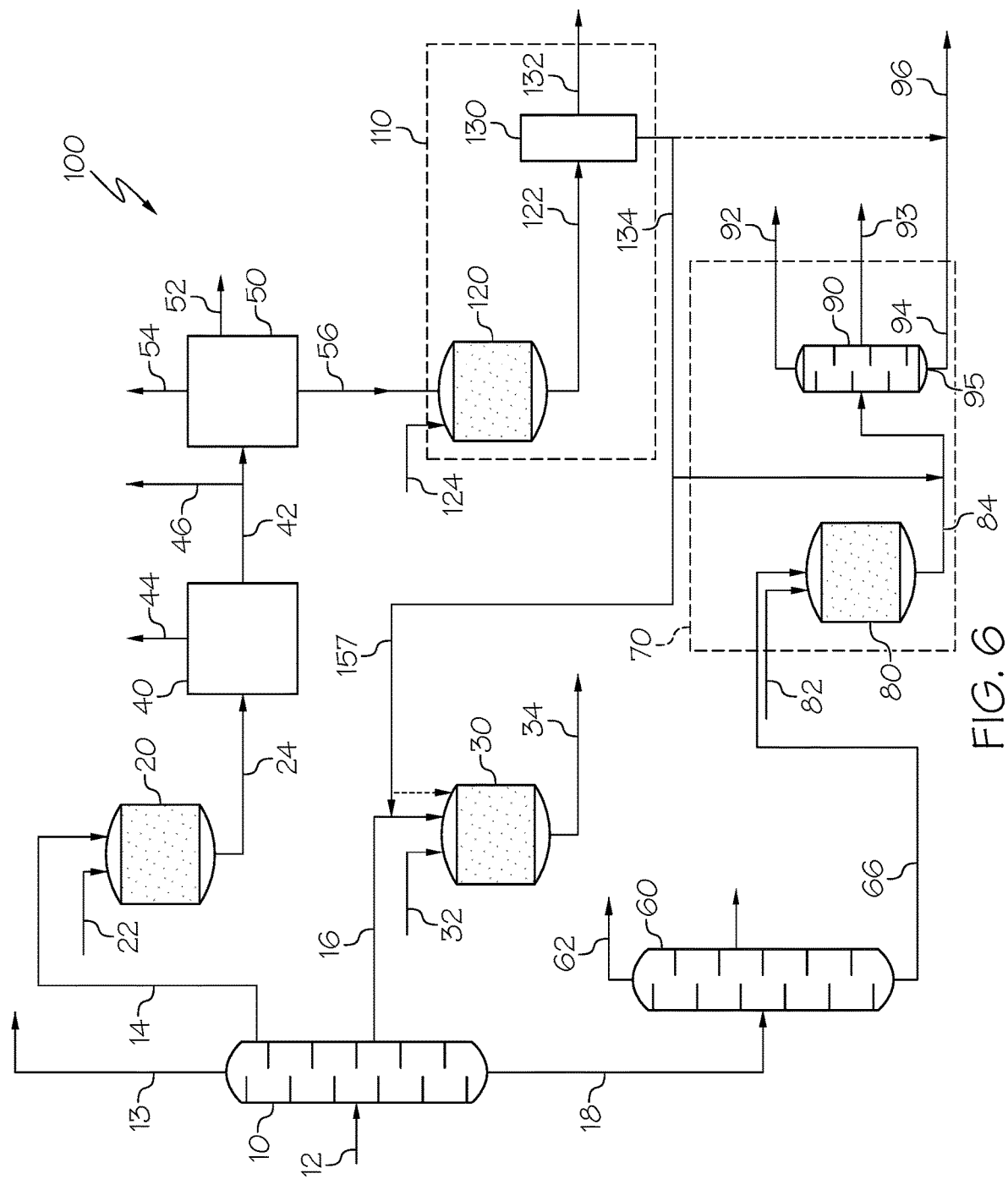
FIG. 6 schematically depicts a generalized flow diagram of still another embodiment of a system for separating and upgrading crude oil, according to one or more embodiments shown and described in this disclosure.

Referring now to FIG. 6, at least a second portion of the hydrodearylated bottoms stream 134 may be passed to the DHT 30 through the hydrodearylated bottoms DHT transfer line 157. The aromatic bottoms stream 56 may be passed to the HAD 110, and the second portion of the hydrodearylated bottoms stream 134 may be passed from the HAD 110 to the DHT 30 in addition to passing the first portion of the hydrodearylated bottoms stream 134 to the RHPU 70. The second portion of the hydrodearylated bottoms stream from hydrodearylated bottoms DHT transfer line 157 may be passed directly to the DHT 30 or may be combined with the diesel stream 16 from the ADU 10 upstream of the DHT 30. The second portion of the hydrodearylated bottoms stream 134 passed to the DHT 30 may be subjected to hydrotreating in the DHT 30 to increase the yield of low sulfur diesel from the system 100.

Referring now to FIG. 7, the system 100 may include an aromatic bottoms atmospheric distillation unit 140 disposed downstream of the ARC 50. The aromatic bottoms atmospheric distillation unit 140 may be in fluid communication with the ARC 50 to receive at least a portion of the aromatic bottoms stream 56 from the ARC 50. The aromatic bottoms atmospheric distillation unit 140 may be operable to separate at least a portion of the aromatic bottoms stream 56 to produce at least a lesser boiling effluent 142 and a greater boiling aromatic bottoms effluent 144. The lesser boiling point effluent 142 may include constituents of the aromatic bottoms stream 56 having boiling point temperatures less than or equal to a cut point temperature of the aromatic bottoms atmospheric distillation unit 140, such as less than or equal to 180° C. The lesser boiling effluent 142 may be a gasoline pool stream and may include C9 and C10 aromatic compounds. The lesser boiling effluent 142 may include constituents of the aromatic bottoms steam 56 having atmospheric boiling point temperatures less than or equal to 180° C.

The greater boiling aromatic bottoms effluent 144 may include constituents of the aromatic bottoms stream 56 having atmospheric boiling point temperatures greater than the cut point temperature of the aromatic bottoms atmospheric distillation unit 140, such as greater than 180° C. The greater boiling aromatic bottoms effluent 144 may include C11+ aromatic compounds. The greater boiling aromatic bottoms effluent 144 may include greater than 90%, greater than 95%, greater than 98%, or even greater than 99% by weight of the C11+ aromatic compounds from the portion of the aromatic bottoms stream 56 passed to the aromatic bottoms atmospheric distillation unit 140.

The aromatic bottoms atmospheric distillation unit 140 may be in fluid communication with the fuel oil effluent 94 from the hydroprocessed effluent separation system 90. At least a portion of the greater boiling aromatic bottoms effluent 144 may be passed from the aromatic bottoms atmospheric distillation unit 140 to the fuel oil effluent 94 and combined with the fuel oil effluent 94 to produce a modified fuel oil stream 96. The C11+ aromatic compounds in the portion of the greater boiling aromatic bottoms effluent 144 combined with the fuel oil effluent 94 may increase the solubility of the asphaltene compounds in the modified fuel oil stream 96, which may reduce or prevent precipitation of asphaltenes and sedimentation in the modified fuel oil stream 96, downstream processing equipment, or both.

Referring still to FIG. 7, the aromatic bottoms atmospheric distillation unit 140 may be in fluid communication with the atmospheric residue 18, the hydroprocessing reactor 80, the hydroprocessed effluent 84, or combinations of these. At least a portion of the greater boiling aromatic bottoms effluent 144 may be passed from the aromatic bottoms atmospheric distillation unit 140 to the atmospheric residue 18, the hydroprocessing reactor 80, the hydroprocessed effluent 84, the hydroprocessed effluent separation system 90, or combinations of these. The C11+ aromatic compounds in the portion of the greater boiling aromatic bottoms effluent 144 may increase the solubility of the asphaltene compounds in the atmospheric residue 18, the hydroprocessing reactor 80, the hydroprocessed effluent 84, or combinations of these, which may reduce or prevent precipitation of asphaltenes and sedimentation in the hydroprocessing reactor 80, the hydroprocessed effluent 84, the hydroprocessed effluent separation system 90, fuel oil effluent 94, other downstream equipment, or combinations of these.

Figure 8:
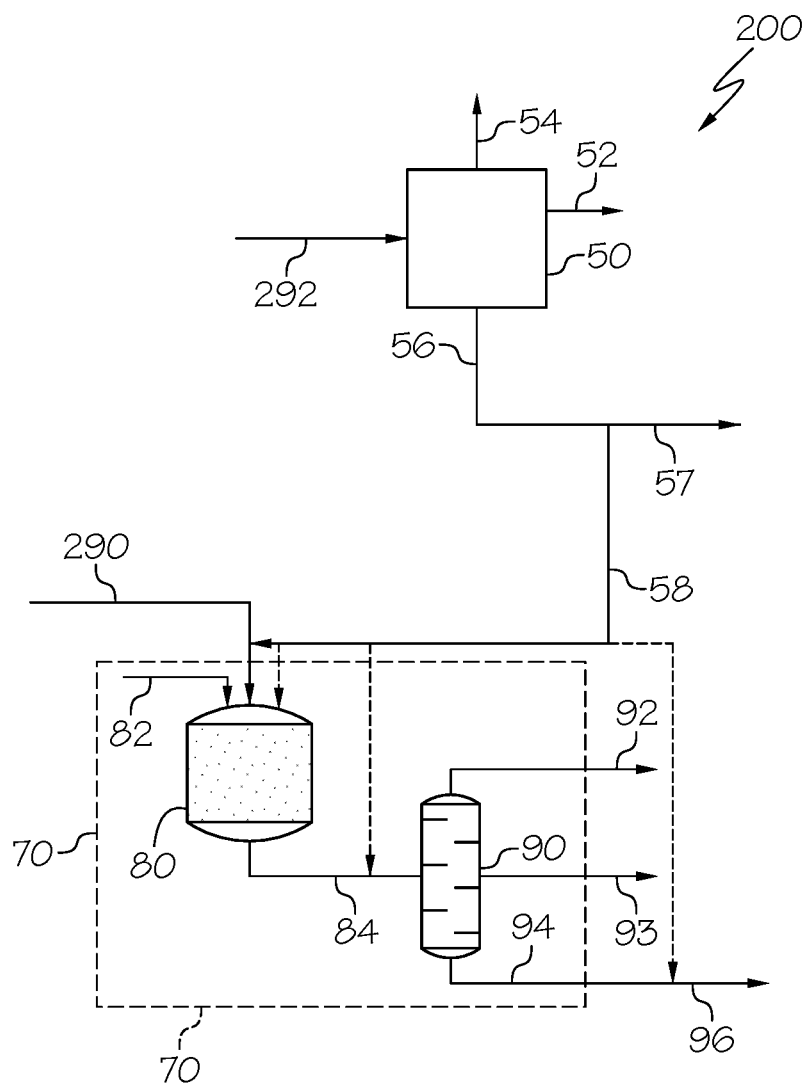
FIG. 8 schematically depicts a generalized flow diagram of a system for upgrading a residue or heavy oil through hydroprocessing while reducing sedimentation, according to one or more embodiments shown and described in this disclosure.

Referring now to FIG. 8, a system 200 for hydroprocessing a hydrocarbon feed 290 comprising asphaltene compounds while reducing sedimentation is schematically depicted. The hydrocarbon feed 290 comprising asphaltene compounds may include heavy oil streams, such as atmospheric residues, vacuum residues, other heavy oils, or combinations of heavy oils. In embodiments, the hydrocarbon feed 290 may include the atmospheric residue 18 or the vacuum residue 66 previously described in the present disclosure.

The system 200 for hydroprocessing the hydrocarbon feed 290 can include the hydroprocessing unit 70, which may include the hydroprocessing reactor 80 and the hydroprocessed effluent separation system 90 downstream of the hydroprocessing reactor 80. The hydroprocessing reactor 80 may be operable to contact the hydrocarbon feed 290 with hydrogen 82 in the presence of at least one hydroprocessing catalyst to produce a hydroprocessed effluent 84. The hydroprocessed effluent separation system 90 may be operable to separate the hydroprocessed effluent 84 into a fuel oil effluent 94 and at least one distillate effluent 93, a light gas effluent 92, or both. The hydroprocessing reactor 80 and the hydroprocessed effluent separation system 90 of the RHPU 70 may have any of the features, arrangements, catalysts, or operating conditions previously described in this disclosure for the RHPU 70.

The system 200 may also include an ARC 50 operable to separate an aromatic containing feed 292, such as a reformate stream from an NREF or other aromatic-containing stream, into at least one aromatic product effluent 52 and an aromatic bottoms stream 56. The ARC 50 may have any of the features, unit operations, configurations, or operating conditions previously described in the present disclosure for the ARC 50. The ARC 50 and the RHPU 70 may be part of the same refinery process or may be disposed in separate refinery systems. The system 200 may include an aromatic bottoms transfer line 58 in fluid communication with the aromatic bottoms stream 56 and the RHPU 70. The aromatic bottoms transfer line 58 may be operable to transfer at least a portion of the aromatic bottoms stream 56 from the ARC 50 to the RHPU 70. The portion of the aromatic bottoms stream 56 from the aromatic bottoms transfer line 58 may increase the solubility of asphaltenes in the hydroprocessing reactor 80, the hydroprocessed effluent 84, the fuel oil effluent 94, or combinations of these, to reduce or prevent sedimentation of asphaltene compounds in the hydroprocessing reactor 80, the hydroprocessed effluent 84, the fuel oil effluent 94, downstream processing equipment, or combinations of these.

The aromatic bottoms transfer line 58 may transfer the portion of the aromatic bottoms stream 56 to the hydroprocessing reactor inlet of the hydroprocessing reactor 80, a hydroprocessing reactor outlet of the hydroprocessing reactor 80, a fuel oil effluent outlet of the hydroprocessed effluent separation system 90, or combinations of these. The aromatic bottoms transfer line 58 may combine the portion of the aromatic bottoms stream 56 with the hydrocarbon feed 290 upstream of the hydroprocessing reactor 80. The aromatic bottoms transfer line 58 may combine the portion of the aromatic bottoms stream 56 with the hydroprocessed effluent 84 downstream of the hydroprocessing reactor 80. The aromatic bottoms transfer line 58 may combine the portion of the aromatic bottoms stream 56 with the fuel oil effluent 94 downstream of the hydroprocessed effluent separation system 90 to produce a modified fuel oil effluent 96. The aromatic bottoms transfer line 58 may pass the portion of the aromatic bottoms stream 56 directly to the hydroprocessing reactor 80, the hydroprocessed effluent separation system 90, or both.

The system 200 may also include the HAD 110, which was previously described in the present disclosure in relation to FIGS. 4-6. The HAD 110 may have any of the features, arrangements, catalysts, or operating conditions previously described in this disclosure for the HAD 110. For example, the HAD 110 (FIG. 4) may include the hydrodearylation reactor 120 operable to contact at least a portion of the aromatic bottoms stream 56 with hydrogen in the presence of the hydrodearylation catalyst to produce a hydrodearylated effluent, and the hydrodearylated effluent separation system 130 disposed downstream of the hydrodearylation reactor 120 and operable to separate the hydrodearylated effluent into a monoaromatics effluent and a hydrodearylated bottoms effluent. The aromatic bottoms transfer line 58 may be operable to pass at least a portion of the hydrodearylated bottoms effluent 134 to the RHPU 70.

Referring again to FIG. 8, method of hydroprocessing a hydrocarbon feed 290 comprising asphaltenes to upgrade the hydrocarbon feed 290 while reducing sedimentation will now be described. The method of hydroprocessing the hydrocarbon feed 290 may include passing the hydrocarbon feed 290 to the RHPU 70, which may include a hydroprocessing reactor 80 that may be operable to contact the hydrocarbon feed 290 with hydrogen 82 in the presence of one or a plurality of hydroprocessing catalysts. The RHPU 70 may have any of the features, arrangements, catalysts, or operating conditions previously described in the present disclosure for the RHPU 70. The contacting in the hydroprocessing reactor 80 may cause at least a portion of hydrocarbon compounds from the hydrocarbon feed 290 to undergo chemical reaction to produce the hydroprocessed effluent 84. The method may further include passing the hydroprocessed effluent 84 to a hydroprocessed effluent separation system 90 operable to separate the hydroprocessed effluent 84 into a fuel oil effluent 94 and at least one distillate effluent 93, a light gas effluent 92, or both.

The method may further include passing the aromatic containing feed 292, such as a reformate, to the ARC 50, where the ARC 50 can process the aromatic containing feed 292 to produce at least one aromatic product effluent 52 and the aromatic bottoms stream 56. The ARC 50 may have any of the features, unit operations, configurations, or operating conditions previously described in the present disclosure for the ARC 50. The method may further include combining at least a portion of the aromatic bottoms stream 56 with the hydrocarbon feed 290 to the RHPU 70, the hydroprocessed effluent 84, the fuel oil effluent 94, or combinations of these. Combining the portion of the aromatic bottoms stream 56 with the hydrocarbon feed 290, the hydroprocessed effluent 84, the fuel oil effluent 94, or combinations of these, or passing the aromatic bottoms stream 56 directly to the hydroprocessing reactor 80, the hydroprocessed effluent separation system 90, or both, may increase the solubility of the asphaltene compounds in the hydroprocessed effluent 84, the fuel oil effluent 94, or both, and may reduce sedimentation in the hydroprocessed effluent 84, the fuel oil effluent 94, or streams downstream of the RHPU 70. This may reduce or prevent deposition of sediments on surfaces of the hydroprocessing reactor 80, the hydroprocessed effluent separation system 90, processing piping, and other equipment. The hydrocarbon feed 290 may be an atmospheric residue, a vacuum residue, or other heavy oil. The hydrocarbon feed 290 may include greater than or equal to 1 weight percent asphaltene compounds based on the total weight of the hydrocarbon feed 290.

The method may include combining the portion of the aromatic bottoms stream 56 with the hydrocarbon feed 290 prior to contacting the hydrocarbon feed 290 with the hydroprocessing catalyst in the hydroprocessing reactor 80. Alternatively or additionally, the method may include passing at least a portion of the aromatic bottoms stream 56 directly to the hydroprocessing reactor 80 and combining the portion of the aromatic bottoms stream 56 with the hydrocarbon feed 290 and hydrogen 82 in the hydroprocessing reactor 80. The method may include combining all or at least a portion of the aromatic bottoms stream 56 with the hydroprocessed effluent 84 downstream of the hydroprocessing reactor 80 and prior to separating the hydroprocessed effluent 84. The method may include combining the portion of the aromatic bottom stream 56 with the fuel oil effluent 94 downstream of the hydroprocessed effluent separation system 90.

Referring now to FIG. 1, a method for separating and upgrading a hydrocarbon feed 12 may include passing the hydrocarbon feed 12 to a distillation unit, such as the ADU 10, the VDU 60, or both, that separates the hydrocarbon feed 12 into at least a naphtha stream 14 and a residue, such as atmospheric residue 18 or vacuum residue 66. The method for separating and upgrading the hydrocarbon feed 12 may include passing the naphtha stream 14 to NHT 20, where the NHT 20 can hydrotreat the naphtha stream 14 to produce a hydrotreated naphtha 24. The method for separating and upgrading the hydrocarbon feed 12 may include passing the hydrotreated naphtha 24 to the NREF 40, where the NREF 40 may reform at least a portion of the hydrotreated naphtha 24 to produce a reformate 42. The method for separating and upgrading the hydrocarbon feed 12 further includes passing at least a portion of the reformate 42 to ARC 50, where the ARC 50 processes the reformate 42 to produce at least one aromatic product effluent 52 and the aromatic bottoms stream 56. The method for separating and upgrading the hydrocarbon feed 12 further includes passing at least a portion of the residue, such as atmospheric residue 18 or vacuum residue 66, to the RHPU 80, where the RHPU 80 hydroprocesses the portion of the residue to produce a hydroprocessed effluent 84. The method for separating and upgrading the hydrocarbon feed 12 may further include passing the hydroprocessed effluent 84 to a hydroprocessed effluent separation system 90 that may separate the hydroprocessed effluent 84 into at least a fuel oil effluent 94 and at least one distillate effluent 93, a light gas effluent 92, or both. The ADU 10, the NHT 20, the NREF 40, the ARC 50, the VDU 60, and the RHPU 70 may have any of the features, configurations, catalysts, or operating conditions previous described in the present disclosure for these unit operations. The method for separating and upgrading the hydrocarbon feed 12 further includes combining at least a portion of the aromatic bottoms stream 56 with the residue (atmospheric residue 18 or vacuum residue 66), the hydroprocessed effluent 84, the fuel oil effluent 94, or combinations of these. Combining the portion of the aromatic bottoms stream 56 with the residue, the hydroprocessed effluent 84, the fuel oil effluent 94, or combinations of these, may increase the solubility of the asphaltene compounds in the hydroprocessed effluent 84, the fuel oil effluent 94, or both, and may reduce sedimentation in the hydroprocessed effluent 84, the fuel oil effluent 94, or other streams downstream of the hydroprocessed effluent separation system 90. This may reduce or prevent deposition of sediments on surfaces of the hydroprocessing reactor 80, the hydroprocessed effluent separation system 90, processing piping, and other equipment.

The method for separating and upgrading the hydrocarbon feed 12 may include combining the portion of the aromatic bottoms stream 56 with the residue prior to hydroprocessing the residue. The method for separating and upgrading the hydrocarbon feed 12 may include combining the portion of the aromatic bottoms stream 56 with the hydroprocessed effluent 84 prior to passing the hydroprocessed effluent 84 to the hydroprocessed effluent separation system 90. The method for separating and upgrading the hydrocarbon feed 12 may include combining the portion of the aromatic bottoms stream 56 with the fuel oil effluent 94 downstream of the hydroprocessed effluent separation system 90.

The hydrocarbon feed 12 may be a crude oil. The residue may include at least 1 weight percent, at least 2 wt. %, at least 5 wt. %, or even at least 10 wt. % asphaltene compounds based on the total weight of the residue. The residue may be the atmospheric residue 18, the vacuum residue 66, or a combination of both. In method for separating and upgrading the hydrocarbon feed 12, the distillation unit may include the ADU 10 that separates the hydrocarbon feed 12 into at least the naphtha stream 14 and the atmospheric residue 18. The method for separating and upgrading the hydrocarbon feed 12 may further include passing the atmospheric residue 18 to VDU 60 to separate the atmospheric residue 18 into at least one vacuum gas oil 62,64 and a vacuum residue 66, where the residue comprises the vacuum residue 66. The RHPU 70 may contact the residue with hydrogen in the presence of at least one hydroprocessing catalyst to produce the hydroprocessed effluent 84.

Referring still to FIG. 1, the distillation unit (ADU 10 or ADU 10 and VDU 60) may separate the hydrocarbon feed 12 into at least the naphtha stream 14, a diesel stream 16, and the residue. The method for separating and upgrading the hydrocarbon feed 12 may further include passing the diesel stream 16 to the DHT 30, where the DHT 30 can contact at least a portion of the diesel stream 16 with hydrogen 32 in the presence of a hydrotreating catalyst to produce a reduced sulfur diesel 34 having a sulfur content less than the diesel stream 16. The DHT 30 may have any of the features, configurations, catalysts or operating conditions previously described in the present disclosure for the DHT 30. The method for separating and upgrading the hydrocarbon feed 12 may further include passing at least a second portion of the aromatic bottoms stream 56 to the DHT 30 through the aromatic bottoms DHT transfer line 57. The method may include combining the second portion of the aromatic bottoms stream 56 with the diesel stream 16 upstream of the DHT 30 or passing the second portion of the aromatic bottoms stream 56 directly to the DHT 30. The DHT 30 may hydrotreat the diesel stream 16 and the second portion of the aromatic bottom stream to produce the reduced sulfur diesel 34. Passing the second portion of the aromatic bottoms stream to the DHT 30 may further increase the yield of gasoline components from the process.

Referring to FIGS. 4-6, any of the methods previously discussed in the present disclosure may include passing the portion of the aromatic bottoms stream 56 to the HAD 110 disposed downstream of the ARC 50. The HAD 110 may contact the portion of the aromatic bottoms stream 56 with hydrogen in the presence of a hydrodearylation catalyst in a hydrodearylation reactor 120 to hydrodearylate at least a portion of the aromatic compounds in the aromatic bottoms stream 56 to produce a hydrodearylated effluent 122. The contacting may cause at least a portion of the aromatic compounds in the aromatic bottoms stream 56 to undergo hydrodearylation to produce the hydrodearylated effluent 122. The methods discussed in the present disclosure may include passing the hydrodearylated effluent to a hydrodearylated effluent separation system 130 that separates the hydrodearylated effluent 122 into a monoaromatics effluent 132 and a hydrodearylated bottoms effluent 134. The methods discussed in the present disclosure may further include passing at least a portion of the hydrodearylated bottoms effluent 134 to the RHPU 70. The methods of the present disclosure may include combining at least a portion of the hydrodearylated bottoms effluent 134 with the residue (atmospheric residue 18 or vacuum residue 66), the hydroprocessed effluent 84, the fuel oil effluent 94, hydrocarbon feed 290 (FIG. 8), or combinations of these. The methods of the present disclosure may further include passing at least a second portion of the hydrodearylated bottoms effluent 134 to the DHT 30.

Referring again to FIG. 7, the system 100 may include the aromatic bottoms atmospheric distillation unit 140 disposed downstream of the ARC 50. Any of the methods of the present disclosure may include passing the at least a portion of the aromatic bottoms stream 56 to the aromatic bottoms atmospheric distillation unit 56, where the aromatic bottoms stream 56 can be separated into a lesser boiling effluent 142 and a greater boiling aromatic bottoms effluent 144. The greater boiling aromatic bottoms effluent 144 may include the C11+ aromatic compounds from the aromatic bottoms stream 56 as previously described in the present disclosure. The methods of the present disclosure may include combining at least a portion of the greater boiling aromatic bottoms effluent 144 with the fuel oil effluent 94 downstream of the hydroprocessed effluent separation system 90. In embodiments, any of the methods of the present disclosure may not include subjecting the hydrocarbon feed 12, 290, atmospheric residue 18, or vacuum residue 66 to a deasphalting process upstream of the RHPU 70.

EXAMPLES

The various embodiments of methods and systems for the processing of heavy oils will be further clarified by the following examples. The examples are illustrative in nature, and should not be understood to limit the subject matter of the present disclosure.

Example 1: Hydroprocessing Vacuum Residue and Combining Aromatic Bottoms with the Hydroprocessed Effluent In Example 1, a vacuum residue derived from heavy crude oil was subjected to hydroprocessing in an ebullated bed hydroprocessing unit comprising two ebullated bed reactors in series. The hydroprocessed effluent was then combined with an aromatic bottoms stream obtained from an aromatics recovery unit. The compositions and properties of the vacuum residue and the aromatic bottoms stream are provided in Table 3.

TABLE 3

Compositions and Properties of the Vacuum Residue and Aromatic Bottoms Stream for Example 1.

| Property/Composition | Units | Vacuum Residue | Aromatic Bottoms Stream |
|---|---|---|---|
| API Gravity | — | 1.6 | — |
| Specific Gravity | — | 1.063 | 0.9226 |
| Sulfur | weight percent | 6.13 | 0 |
| Nitrogen | ppmw | 3781 | 0 |
| MCR* | weight percent | 29.5 | 0 |
| C7 asphaltenes | weight percent | 20.74 | 0 |
| C5 asphaltenes | weight percent | 32.18 | 0 |
| Nickel | ppmw | 46.7 | 0 |
| Vanadium | ppmw | 137.0 | 0 |
| Carbon | weight percent | 83.61 | — |
| Hydrogen | weight percent | 10.15 | — |
| IBP | °C. | 538 | 198 |
| BP 5 wt. % | °C. | 562 | 207 |
| BP 10 wt. % | °C. | 579 | 211 |
| BP 20 wt. % | °C. | 608 | 228 |
| BP 30 wt. % | °C. | 638 | 236 |
| BP 40 wt. % | °C. | 677 | 257 |
| FBP | °C. | 735 | 400 |
| Recovery | weight percent | 46.2 | — |
| 538° C.+ | weight percent | 94.2 | — |

*MCR is micro carbon residue as determined according to ASTM D4530

Hydrogen was introduced to the ebullated bed unit in an amount equal to 1.9 wt. % of the feed. Each of the ebullated bed reactors contained a hydroprocessing catalyst and the reactors were operated under conditions sufficient to upgrade at least a portion of the hydrocarbons in the hydrocarbon feed (vacuum residue) to produce a hydroprocessed effluent comprising at least a naphtha fraction (boiling point temperature from C5 to 150° C.), a distillate fraction (boiling point temperature from 150° C. to 375° C.), and a vacuum gas oil fraction (boiling point temperature from 375° C. to 524° C.).

The hydroprocessed effluent was then combined with 2 wt. % of the aromatic bottoms stream based on the total weight of the hydroprocessed effluent. The composition of the combined stream of Example 1 comprising the hydroprocessed effluent mixed with the aromatic bottoms stream is provided in Table 4.

Comparative Example 2: Hydroprocessing the Vacuum Residue Only

In Comparative Example 2, the vacuum residue derived from heavy crude oil was subjected to hydroprocessing in the ebullated bed hydroprocessing unit described in Example 1 and the hydroprocessed effluent was not combined with any portion of the aromatic bottoms. The compositions and properties of the vacuum residue stream are provided in Table 3 and the reactor and reactor conditions are described previously in relation to Example 1. The composition and properties of the hydroprocessed effluent of Comparative Example 2 is provided in Table 4.

TABLE 4

Composition of Hydroprocessed Effluent from Example 1 and Comparative Example 2.

| Constituent | Example 1 Yield (wt. %) | Comparative Example 2 Yield (wt.) |
|---|---|---|
| Hydrogen Sulfide (H2S) | 5.16 | 5.16 |
| Ammonia (NH3) | 0.16 | 0.16 |
| Methane (C1) | 0.71 | 0.71 |
| Ethane (C2) | 0.58 | 0.58 |
| Propane (C3) | 0.65 | 0.65 |
| Isobutene (iC4) | 0.13 | 0.13 |
| n-Butane (nC4) | 0.47 | 0.47 |
| Naphtha (C5-150° C.) | 1.96 | 2.00 |
| Distillate (150-375° C.) | 18.92 | 17.31 |
| Vacuum gas oil (375-524° F.) | 20.40 | 20.84 |
| Unconverted Residue (524° F.+) | 52.77 | 53.90 |
| Total | 101.91 | 101.91 |

As shown in Table 4, combining at least a portion of the aromatic bottoms stream with the vacuum residue and hydroprocessing both the vacuum residue and the aromatic bottoms stream in Example 1 resulted in an increase in the yield of distillate of 2 wt. % compared to hydroprocessing just the vacuum residue as in Comparative Example 2.

The hydroprocessing effluent from Comparative Example 2 was then fractionated to produce a fractionator bottoms (fuel oil stream) and at least one distillate. The total sediment content of the fractionator bottoms produced using only the vacuum residue was determined to be 150 parts per million by weight. The total sediment content was determined according to standard test method ASTM D4870.

Example 3: Evaluation of Sedimentation

For Example 3, the combined mixture of the hydroprocessed effluent and aromatic bottoms of Example 1 and the hydroprocessed effluent of Comparative Example 2 were fractionated and the fractionation bottoms (fuel oil effluent) obtained from each was evaluated for sedimentation according to the standard test method in ASTM D4870. When 2 wt. % aromatic bottoms was added to the hydroprocessed effluent as in Example 1, the sedimentation observed in the fractionator bottoms was reduced by 10% compared to the sedimentation observed for the fractionator bottoms obtained from the hydroprocessed effluent Comparative Example 2 (without the aromatic bottoms added). Thus, Example 3 shows that adding the aromatic bottoms to the hydroprocessed effluent can reduce sedimentation in the downstream fractionator bottoms.

The portion of the aromatic bottoms stream added to the hydroprocessed effluent was increased to 30 wt. %. When the amount of aromatic bottoms added to the hydroprocessed effluent was increased to 30% by weight of the hydroprocessed effluent, the sedimentation was reduced by 50% compared to the sedimentation observed for the fractionator bottoms derived from Comparative Example 2 (without the aromatic bottoms added). Example 3 shows that adding the aromatic bottoms stream to the hydroprocessed effluent can reduce sedimentation in the fuel oil effluent.

A first aspect of the present disclosure may include a method of hydroprocessing a hydrocarbon feed comprising asphaltenes to upgrade the hydrocarbon feed while reducing sedimentation. The method may include passing the hydrocarbon feed to a hydroprocessing reactor that may contact the hydrocarbon feed with hydrogen in the presence of one or a plurality of hydroprocessing catalysts, where the contacting may cause at least a portion of hydrocarbon compounds from the hydrocarbon feed to undergo chemical reaction to produce a hydroprocessed effluent. The method may further include passing the hydroprocessed effluent to a hydroprocessed effluent separation system that may separate the hydroprocessed effluent into a fuel oil effluent and at least one distillate effluent and passing a reformate to an aromatics recovery complex that may process the reformate to produce at least one aromatic product effluent and an aromatic bottoms stream. The method may further include combining at least a portion of the aromatic bottoms stream with the hydrocarbon feed, the hydroprocessed effluent, the fuel oil effluent, or combinations of these. Combining the at least a portion of the aromatic bottoms stream with the hydrocarbon feed, the hydroprocessed effluent, the fuel oil effluent, or combinations of these, may increase the solubility of the asphaltene compounds in the hydroprocessed effluent, the fuel oil effluent, or both, and may reduce sedimentation in the hydroprocessing reactor, the hydroprocessed effluent, the hydroprocessed effluent separation system, the fuel oil effluent, or other downstream equipment.

A second aspect of the present disclosure may include the first aspect, in which the hydrocarbon feed may be an atmospheric residue or a vacuum residue.

A third aspect of the present disclosure may include either one of the first or second aspects, comprising combining the portion of the aromatic bottoms stream with the hydrocarbon feed prior to contacting the hydrocarbon feed with the hydrogen in the hydroprocessing unit or passing the aromatic bottoms stream directly to the hydroprocessing reactor.

A fourth aspect of the present disclosure may include any one of the first through third aspects, comprising combining the portion of the aromatic bottoms stream with the hydroprocessed effluent prior to separating the hydroprocessed effluent.

A fifth aspect of the present disclosure may include any one of the first through fourth aspects, comprising combining the portion of the aromatic bottom stream with the fuel oil effluent.

A sixth aspect of the present disclosure may include any one of the first through fifth aspects, further comprising passing the portion of the aromatic bottoms stream to a hydrodearylation unit disposed downstream of the aromatics recovery complex. The hydrodearylation unit may contact the portion of the aromatic bottoms stream with hydrogen in the presence of a hydrodearylation catalyst to hydrodearylate at least a portion of the aromatic compounds in the portion of the aromatic bottoms stream to produce a hydrodearylated effluent. The method may further include passing the hydrodearylated effluent to a hydrodearylated effluent separation system that may separate the hydrodearylated effluent into a monoaromatics effluent and a hydrodearylated bottoms effluent and combining at least a portion of the hydrodearylated bottoms effluent with the hydrocarbon feed, the hydroprocessed effluent, the fuel oil effluent, or combinations of these. Combining the at least a portion of the hydrodearylated bottoms effluent with the hydrocarbon feed may include combining the hydrodearylated bottoms effluent with the hydrocarbon feed upstream of the hydroprocessing reactor or passing the hydrodearylated bottoms effluent to the hydroprocessing reactor, where it mixes with the hydrocarbon feed in the hydroprocessing reactor.

A seventh aspect of the present disclosure may include any one of the first through sixth aspects, where the hydrocarbon feed may comprise an atmospheric residue and the method may further comprise passing the at least a portion of the aromatic bottoms stream to an aromatic bottoms atmospheric distillation unit that may separate the aromatic bottoms stream into a lesser boiling effluent and a greater boiling aromatic bottoms effluent and combining at least a portion of the greater boiling aromatic bottoms effluent with the hydrocarbon feed, the hydroprocessed effluent, the fuel oil effluent, or combinations of these. Combining the at least a portion of the greater boiling aromatic bottoms effluent with the hydrocarbon feed may include combining the greater boiling aromatic bottoms effluent with the hydrocarbon feed upstream of the hydroprocessing reactor or passing the greater boiling aromatic bottoms effluent to the hydroprocessing reactor, where it mixes with the hydrocarbon feed in the hydroprocessing reactor.

An eighth aspect of the present disclosure may include any one of the first through seventh aspects, in which the hydrocarbon feed to the hydroprocessing may comprise greater than or equal to 1 weight percent asphaltene compounds.

A ninth aspect of the present disclosure may include any one of the first through eighth aspects, in which the hydrocarbon feed may not be subjected to a deasphalting process prior to contacting with the hydrogen in the presence of the hydroprocessing catalyst.

A tenth aspect of the present disclosure may be directed to a process for separating and upgrading a hydrocarbon feed. The process may include passing the hydrocarbon feed to a distillation unit that may separate the hydrocarbon feed into at least a naphtha stream and a residue, passing the naphtha stream to a naphtha hydrotreating unit that may hydrotreat the naphtha stream to produce a hydrotreated naphtha, passing the hydrotreated naphtha to a naphtha reforming unit that may reform the hydrotreated naphtha to produce a reformate, passing the reformate to an aromatics recovery complex that may process the reformate to produce at least one aromatic product effluent and an aromatic bottoms stream, passing at least a portion of the residue to a residue hydroprocessing unit that may hydroprocess the portion of the residue in a hydroprocessing reactor to produce a hydroprocessed effluent, passing the hydroprocessed effluent to a hydroprocessed effluent separation system of the residue hydroprocessing unit that may separate the hydroprocessed effluent into at least a fuel oil effluent and at least one distillate effluent, and combining at least a portion of the aromatic bottoms stream with the residue, the hydroprocessed effluent, the fuel oil effluent, or combinations of these. Combining the portion of the aromatic bottoms stream with the residue, the hydroprocessed effluent, the fuel oil effluent, or combinations of these, may increase the solubility of the asphaltene compounds in the hydroprocessed effluent, the fuel oil effluent, or both, or may reduce sedimentation in the hydroprocessing reactor, the hydroprocessed effluent, the hydroprocessed effluent separation system, the fuel oil effluent, or other downstream equipment.

An eleventh aspect of the present disclosure may include the tenth aspect, where the hydrocarbon feed may be a crude oil.

A twelfth aspect of the present disclosure may include either one of the tenth or eleventh aspects, where the residue may comprise at least 1 weight percent asphaltene compounds based on the total weight of the residue.

A thirteenth aspect of the present disclosure may include any one of the tenth through twelfth aspects, in which the residue may be an atmospheric residue, a vacuum residue, or both.

A fourteenth aspect of the present disclosure may include any one of the tenth through thirteenth aspects, in which the distillation unit may comprise an atmospheric distillation unit that may separate the hydrocarbon feed into at least the naphtha stream and an atmospheric residue.

A fifteenth aspect of the present disclosure may include any one of the tenth through fourteenth aspects, further comprising passing the atmospheric residue to a vacuum distillation unit that may separate the atmospheric residue into at least one vacuum gas oil and a vacuum residue, where the residue may comprise the vacuum residue.

A sixteenth aspect of the present disclosure may include any one of the tenth through fifteenth aspects, further comprising contacting the residue with hydrogen in the presence of at least one hydroprocessing catalyst in the hydroprocessing reactor to produce the hydroprocessed effluent.

A seventeenth aspect of the present disclosure may include any one of the tenth through sixteenth aspects, comprising combining the portion of the aromatic bottoms stream with the residue, wherein combining the portion of the aromatic bottoms stream with the residue may comprise passing the portion of the aromatic bottoms stream directly to the hydroprocessing reactor and mixing the residue and the aromatic bottoms stream in the hydroprocessing reactor or combining the portion of the aromatic bottoms stream with the residue upstream of the hydroprocessing reactor.

An eighteenth aspect of the present disclosure may include any one of the tenth through seventeenth aspects, comprising combining the portion of the aromatic bottoms stream with the hydroprocessed effluent prior to passing the hydroprocessed effluent to the hydroprocessed effluent separation system or in the hydroprocessed effluent separation system.

A nineteenth aspect of the present disclosure may include any one of the tenth through eighteenth aspects, comprising combining the portion of the aromatic bottoms stream with the fuel oil effluent downstream of the hydroprocessed effluent separation system.

A twentieth aspect of the present disclosure may include any one of the tenth through nineteenth aspects, further comprising passing the portion of the aromatic bottoms stream to a hydrodearylation unit downstream of the aromatics recovery complex, where the hydrodearylation unit may contact the portion of the aromatic bottoms stream with hydrogen in the presence of a hydrodearylation catalyst to cause at least a portion of the aromatic compounds in the aromatic bottoms stream to undergo hydrodearylation to produce a hydrodearylated effluent. The method may further include passing the hydrodearylated effluent to a hydrodearylated effluent separation system that may separate the hydrodearylated effluent into a monoaromatics effluent and a hydrodearylated bottoms effluent, and combining at least a portion of the hydrodearylated bottoms effluent with the residue in the hydroprocessing reactor or upstream of the hydroprocessing reactor, with the hydroprocessed effluent, with the fuel oil effluent, or with combinations of these.

A twenty-first aspect of the present disclosure may include the twentieth aspect, further comprising passing at least a second portion of the hydrodearylated bottoms effluent to a diesel hydrotreating unit in fluid communication with a diesel stream produced by the distillation unit or combining the at least a second portion of the hydrodearylated bottoms effluent with the diesel stream upstream of the diesel hydrotreating unit.

A twenty-second aspect of the present disclosure may include any one of the tenth through twenty-first aspects, where the distillation unit may comprise an atmospheric distillation unit, and the residue may comprise an atmospheric residue from the atmospheric distillation unit.

A twenty-third aspect of the present disclosure may include any one of the tenth through twenty-second aspects, further comprising passing the portion of the aromatic bottoms stream to an aromatic bottoms atmospheric distillation unit downstream of the aromatics recovery complex, where the aromatic bottoms atmospheric distillation unit may separate the portion of the aromatic bottoms into at least a lesser boiling effluent and a greater boiling aromatic bottoms effluent. The method may further include combining at least a portion of the greater boiling aromatic bottoms effluent with the residue, the hydroprocessed effluent, the fuel oil effluent, or combinations of these, where combining the at least a portion of the greater boiling aromatic bottoms effluent with the residue includes passing the greater boiling aromatic bottoms effluent directly to the hydroprocessing reactor or combining the greater boiling aromatic bottoms effluent with the residue upstream of the hydroprocessing reactor.

A twenty-fourth aspect of the present disclosure may include any one of the tenth through twenty-third aspects, where the distillation unit may separate the hydrocarbon feed into at least the naphtha stream, a diesel stream, and the residue.

A twenty-fifth aspect of the present disclosure may include the twenty-fourth aspect, further comprising passing the diesel stream to a diesel hydrotreating unit, where the diesel hydrotreating unit may contact at least a portion of the diesel stream with hydrogen in the presence of a hydrotreating catalyst to produce a reduced sulfur diesel having a sulfur content less than the diesel stream.

A twenty-sixth aspect of the present disclosure may include the twenty-fifth aspect, further comprising combining at least another portion of the aromatic bottoms with the diesel stream upstream of the diesel hydrotreating unit or passing the at least another portion of the aromatic bottoms directly to the diesel hydrotreating unit.

A twenty-seventh aspect of the present disclosure may include any one of the tenth through twenty-sixth aspects, in which the residue is not subjected to a deasphalting process prior to hydroprocessing the residue in the residue hydroprocessing unit.

A twenty-eighth aspect of the present disclosure may be directed to a system for hydroprocessing a hydrocarbon feed comprising asphaltene compounds while reducing sedimentation. The system may include a hydroprocessing unit comprising a hydroprocessing reactor and a hydroprocessed effluent separation system downstream of the hydroprocessing reactor. The hydroprocessing reactor may be operable to contact the hydrocarbon feed with hydrogen in the presence of at least one hydroprocessing catalyst to produce a hydroprocessed effluent, and the hydroprocessed effluent separation system may be operable to separate the hydroprocessed effluent into a fuel oil effluent and at least one distillate effluent. The system may further include an aromatics recovery complex operable to separate a reformate stream into at least one aromatic product effluent and an aromatic bottoms stream and an aromatic bottoms transfer line operable to transfer at least a portion of the aromatic bottoms stream from the aromatics recovery complex to the hydroprocessing unit, where the portion of the aromatic bottoms stream may increase the solubility of asphaltenes in the hydroprocessing reactor, the hydroprocessed effluent, the fuel oil effluent, or combinations of these, to reduce or prevent sedimentation of asphaltenes.

A twenty-ninth aspect of the present disclosure may include the twenty-eighth aspect, where the aromatic bottoms transfer line may be operable to transfer the portion of the aromatic bottoms stream to a hydroprocessing reactor inlet of the hydroprocessing reactor, a hydroprocessing reactor outlet of the hydroprocessing reactor, a fuel oil effluent outlet of the hydroprocessed effluent separation system, or combinations of these.

A thirtieth aspect of the present disclosure may include either one of the twenty-eighth or twenty-ninth aspects, in which the aromatic bottoms transfer line may further comprise a hydrodearylation unit disposed downstream of the aromatics recovery complex. The hydrodearlyation unit may include a hydrodearylation reactor operable to contact at least a portion of the aromatic bottoms stream with hydrogen in the presence of a hydrodearylation catalyst to produce a hydrodearylated effluent and a hydrodearylated effluent separation system disposed downstream of the hydrodearylation reactor and operable to separate the hydrodearylated effluent into a monoaromatics effluent and a hydrodearylated bottoms effluent. The aromatic bottoms transfer line may be operable to pass at least a portion of the hydrodearylated bottoms effluent to the hydroprocessing unit.

A thirty-first aspect of the present disclosure may include any one of the twenty-eighth through thirtieth aspects, in which the residue is an atmospheric residue, a vacuum residue, or both.

A thirty-second aspect of the present disclosure may include any one of the twenty-eighth through thirty-first aspects, further comprising an aromatic bottoms atmospheric distillation unit disposed downstream of the aromatics recovery complex. The aromatic bottoms atmospheric distillation unit may be operable to separate at least a portion of the aromatic bottoms stream to produce at least a lesser boiling effluent and the greater boiling aromatic bottoms effluent, where the aromatic bottoms transfer line may be operable to pass at least a portion of the greater boiling aromatic bottoms effluent to the hydroprocessing unit.

A thirty-third aspect of the present disclosure may include any one of the twenty-eighth through thirty-second aspects, where the system does not include a deasphalting unit upstream of the hydroprocessing unit.

A thirty-fourth aspect of the present disclosure may be directed to a system for upgrading a hydrocarbon feed. The system may include a distillation unit operable to separate the hydrocarbon feed into at least a naphtha stream and a residue comprising asphaltene compounds, a naphtha hydrotreating unit disposed downstream of the distillation unit and operable to contact the naphtha stream with hydrogen in the presence of at least one hydrotreating catalyst to produce a hydrotreated naphtha, a naphtha reforming unit disposed downstream of the naphtha hydrotreating unit and operable to reform the hydrotreated naphtha to produce a reformate, an aromatics recovery complex operable to separate the reformate into at least one aromatic product effluent and an aromatic bottoms stream, and a residue hydroprocessing unit comprising a hydroprocessing reactor and a hydroprocessed effluent separation system downstream of the hydroprocessing reactor. The hydroprocessing reactor may be operable to contact the residue with hydrogen in the presence of at least one hydroprocessing catalyst to produce a hydroprocessed effluent, and the hydroprocessed effluent separation system may be operable to separate the hydroprocessed effluent into a fuel oil effluent and at least one distillate effluent. The system may further include an aromatic bottoms transfer line operable to transfer at least a portion of the aromatic bottoms stream from the aromatics recovery complex to the residue hydroprocessing unit, where the portion of the aromatic bottoms stream can increase the solubility of asphaltenes in the hydroprocessing reactor, the hydroprocessed effluent, the fuel oil effluent, or combinations of these, to reduce or prevent sedimentation in downstream equipment.

A thirty-fifth aspect of the present disclosure may include the thirty-fourth aspect, where the hydrocarbon feed may be crude oil.

A thirty-sixth aspect of the present disclosure may include either one of the thirty-fourth or thirty-fifth aspects, where the aromatic bottoms transfer line may be operable to transfer the portion of the aromatic bottoms stream to a hydroprocessing reactor inlet of the residue hydroprocessing reactor, a hydroprocessing reactor outlet of the residue hydroprocessing reactor, a fuel oil effluent outlet of the hydroprocessed effluent separation system, or combinations of these.

A thirty-seventh aspect of the present disclosure may include any one of the thirty-fourth through thirty-sixth aspects, further comprise a hydrodearylation unit disposed downstream of the aromatics recovery complex and upstream of the residue hydroprocessing unit. The hydrodearylation unit may comprise a hydrodearylation reactor operable to contact at least a portion of the aromatic bottoms stream with hydrogen in the presence of a hydrodearylation catalyst to produce a hydrodearylated effluent and a hydrodearylated effluent separation system disposed downstream of the hydrodearylation reactor and operable to separate the hydrodearylated effluent into a monoaromatics effluent and a hydrodearylated bottoms effluent. The hydrodearylated effluent separation system may be in fluid communication with the residue hydroprocessing unit to pass at least a portion of the hydrodearylated bottoms effluent to the residue hydroprocessing unit.

A thirty-eighth aspect of the present disclosure may include any one of the thirty-fourth through thirty-seventh aspects, in which the distillation unit may comprise an atmospheric distillation unit and the residue may comprise an atmospheric residue.

A thirty-ninth-aspect of the present disclosure may include any one of the thirty-fourth through thirty-eighth aspects, further comprising an aromatic bottoms atmospheric distillation unit disposed downstream of the aromatics recovery complex and upstream of the residue hydroprocessing unit. The aromatic bottoms atmospheric distillation unit may be operable to separate at least a portion of the aromatic bottoms stream to produce at least a lesser boiling effluent and the greater boiling aromatic bottoms effluent. The aromatic bottoms atmospheric distillation unit is fluidly coupled to the residue hydroprocessing unit to pass at least a portion of the greater boiling aromatic bottoms effluent to the residue hydroprocessing unit.

A fortieth aspect of the present disclosure may include any one of the thirty-fourth through thirty-ninth aspects, in which the distillation unit comprises an atmospheric distillation unit operable to separate the hydrocarbon feed into at least the naphtha stream and an atmospheric residue and a vacuum distillation unit disposed downstream of the atmospheric distillation unit and operable to separate the atmospheric residue into one or more vacuum gas oil effluents and a vacuum residue.

A forty-first aspect of the present disclosure may include the fortieth aspect, where the residue may be the vacuum residue from the vacuum distillation unit.

A forty-second aspect of the present disclosure may include any one of the thirty-fourth through forty-first aspects, where the distillation unit may be operable to separate the hydrocarbon feed into the naphtha stream, a diesel stream, and the residue.

A forty-third aspect of the present disclosure may include the forty-second aspect, further comprising a diesel hydrotreating unit downstream of the distillation unit and operable to contact at least a portion of the diesel stream with hydrogen in the presence of at least one hydrotreating catalyst to produce a reduced sulfur diesel having a sulfur content less than the diesel stream.

A forty-fourth aspect of the present disclosure may include the forty-third aspect, further comprising an aromatic bottoms DHT transfer line operable to transfer at least another portion of the aromatic bottoms stream to the diesel hydrotreating unit or to the diesel stream upstream of the diesel hydrotreating unit.

A forty-fifth aspect of the present disclosure may include any one of the thirty-fourth through forty-fourth aspects, in which the system does not include a deasphalting unit downstream of the distillation unit or upstream of the residue hydroprocessing unit.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A process for separating and upgrading a hydrocarbon feed, the process comprising:
    passing the hydrocarbon feed to a distillation unit that separates the hydrocarbon feed into at least a naphtha stream and a residue;
    passing the naphtha stream to a naphtha hydrotreating unit that hydrotreats the naphtha stream to produce a hydrotreated naphtha;
    passing the hydrotreated naphtha to a naphtha reforming unit that reforms the hydrotreated naphtha to produce a reformate;
    passing the reformate to an aromatics recovery complex that processes the reformate to produce at least one aromatic product effluent and an aromatic bottoms stream;
    passing at least a portion of the residue to a residue hydroprocessing unit that hydroprocesses the portion of the residue in a hydroprocessing reactor to produce a hydroprocessed effluent;
    passing the hydroprocessed effluent to a hydroprocessed effluent separation system of the residue hydroprocessing unit, where the hydroprocessed effluent separation system separates the hydroprocessed effluent into at least a fuel oil effluent and at least one distillate effluent; and
    combining at least a portion of the aromatic bottoms stream with the residue, the hydroprocessed effluent, the fuel oil effluent, or combinations thereof, where combining the portion of the aromatic bottoms stream with the residue, the hydroprocessed effluent, the fuel oil effluent, or combinations thereof, increases the solubility of the asphaltene compounds in the hydroprocessed effluent, the fuel oil effluent, or both, or reduces sedimentation in the hydroprocessing reactor, the hydroprocessed effluent, the hydroprocessed effluent separation system, the fuel oil effluent, or other downstream equipment.

2. The process of claim 1, where the hydrocarbon feed is a crude oil.

3. The process of claim 1, in which the residue is an atmospheric residue, a vacuum residue, or both.

4. The process of claim 1, in which the distillation unit comprises an atmospheric distillation unit that separates the hydrocarbon feed into at least the naphtha stream and an atmospheric residue.

5. The process of claim 4, further comprising passing the atmospheric residue to a vacuum distillation unit that separates the atmospheric residue into at least one vacuum gas oil and a vacuum residue, where the residue comprises the vacuum residue.

6. The process of claim 1, further comprising contacting the residue with hydrogen in the presence of at least one hydroprocessing catalyst in the hydroprocessing reactor to produce the hydroprocessed effluent.

7. The process of claim 1, comprising combining the portion of the aromatic bottoms stream with the residue, wherein combining the portion of the aromatic bottoms stream with the residue comprises passing the portion of the aromatic bottoms stream directly to the hydroprocessing reactor and mixing the residue and the aromatic bottoms stream in the hydroprocessing reactor or combining the portion of the aromatic bottoms stream with the residue upstream of the hydroprocessing reactor.

8. The process of claim 1, comprising combining the portion of the aromatic bottoms stream with the hydroprocessed effluent prior to passing the hydroprocessed effluent to the hydroprocessed effluent separation system or in the hydroprocessed effluent separation system.

9. The process of claim 1, comprising combining the portion of the aromatic bottoms stream with the fuel oil effluent downstream of the hydroprocessed effluent separation system.

10. The process of claim 1, further comprising:
passing the portion of the aromatic bottoms stream to a hydrodearylation unit downstream of the aromatics recovery complex, where the hydrodearylation unit contacts the portion of the aromatic bottoms stream with hydrogen in the presence of a hydrodearylation catalyst to cause at least a portion of the aromatic compounds in the aromatic bottoms stream to undergo hydrodearylation to produce a hydrodearylated effluent;
passing the hydrodearylated effluent to a hydrodearylated effluent separation system that separates the hydrodearylated effluent into a monoaromatics effluent and a hydrodearylated bottoms effluent; and
combining at least a portion of the hydrodearylated bottoms effluent with the residue in the hydroprocessing reactor or upstream of the hydroprocessing reactor, with the hydroprocessed effluent, with the fuel oil effluent, or with combinations thereof.

11. The process of claim 10, further comprising passing at least a second portion of the hydrodearylated bottoms effluent to a diesel hydrotreating unit in fluid communication with a diesel stream produced by the distillation unit or combining the at least a second portion of the hydrodearylated bottoms effluent with the diesel stream upstream of the diesel hydrotreating unit.

12. The process of claim 1, further comprising:
passing the portion of the aromatic bottom stream to an aromatic bottoms atmospheric distillation unit downstream of the aromatics recovery complex, where the aromatic bottoms atmospheric distillation unit separates the portion of the aromatic bottoms into at least a lesser boiling effluent and a greater boiling aromatic bottoms effluent; and
combining at least a portion of the greater boiling aromatic bottoms effluent with the residue, the hydroprocessed effluent, the fuel oil effluent, or combinations thereof, where combining the at least a portion of the greater boiling aromatic bottoms effluent with the residue includes passing the greater boiling aromatic bottoms effluent directly to the hydroprocessing reactor or combining the greater boiling aromatic bottoms effluent with the residue upstream of the hydroprocessing reactor.

13. The process of any of claim 1, where the distillation unit separates the hydrocarbon feed into at least the naphtha stream, a diesel stream, and the residue, and the process further comprises:
passing the diesel stream to a diesel hydrotreating unit, where the diesel hydrotreating unit contacts at least a portion of the diesel stream with hydrogen in the presence of a hydrotreating catalyst to produce a reduced sulfur diesel having a sulfur content less than the diesel stream; and
combining at least another portion of the aromatic bottoms with the diesel stream upstream of the diesel hydrotreating unit or passing the at least another portion of the aromatic bottoms directly to the diesel hydrotreating unit.

14. A system for upgrading a hydrocarbon feed, the system comprising:
a distillation unit operable to separate the hydrocarbon feed into at least a naphtha stream and a residue comprising asphaltene compounds;
a naphtha hydrotreating unit disposed downstream of the distillation unit and operable to contact the naphtha stream with hydrogen in the presence of at least one hydrotreating catalyst to produce a hydrotreated naphtha;
a naphtha reforming unit disposed downstream of the naphtha hydrotreating unit and operable to reform the hydrotreated naphtha to produce a reformate;
an aromatics recovery complex operable to separate the reformate into at least one aromatic product effluent and an aromatic bottoms stream;
a residue hydroprocessing unit comprising a hydroprocessing reactor and a hydroprocessed effluent separation system downstream of the hydroprocessing reactor, where;
the hydroprocessing reactor is operable to contact the residue with hydrogen in the presence of at least one hydroprocessing catalyst to produce a hydroprocessed effluent; and
the hydroprocessed effluent separation system is operable to separate the hydroprocessed effluent into a fuel oil effluent and at least one distillate effluent;
an aromatic bottoms transfer line operable to transfer at least a portion of the aromatic bottoms stream from the aromatics recovery complex to the residue hydroprocessing unit, where the portion of the aromatic bottoms stream increases the solubility of asphaltenes in the hydroprocessing reactor, the hydroprocessed effluent, the fuel oil effluent, or combinations thereof, to reduce or prevent sedimentation in downstream equipment.

15. The system of claim 14, where the aromatic bottoms transfer line is operable to transfer the portion of the aromatic bottoms stream to a hydroprocessing reactor inlet of the residue hydroprocessing reactor, a hydroprocessing reactor outlet of the residue hydroprocessing reactor, a fuel oil effluent outlet of the hydroprocessed effluent separation system, or combinations thereof.

16. The system of claim 14, further comprising a hydrodearylation unit disposed downstream of the aromatics recovery complex and upstream of the residue hydroprocessing unit, the hydrodearlyation unit comprising:
- a hydrodearylation reactor operable to contact at least a portion of the aromatic bottoms stream with hydrogen in the presence of a hydrodearylation catalyst to produce a hydrodearylated effluent; and
- a hydrodearylated effluent separation system disposed downstream of the hydrodearylation reactor and operable to separate the hydrodearylated effluent into a monoaromatics effluent and a hydrodearylated bottoms effluent;
- where the hydrodearylated effluent separation system is in fluid communication with the residue hydroprocessing unit to pass at least a portion of the hydrodearylated bottoms effluent to the residue hydroprocessing unit.

17. The system of claim 14, further comprising an aromatic bottoms atmospheric distillation unit disposed downstream of the aromatics recovery complex, the aromatic bottoms atmospheric distillation unit operable to separate at least a portion of the aromatic bottoms stream to produce at least a lesser boiling effluent and the greater boiling aromatic bottoms effluent, where the aromatic bottoms atmospheric distillation unit is fluidly coupled to the residue hydroprocessing unit to pass at least a portion of the greater boiling aromatic bottoms effluent to the residue hydroprocessing unit.

18. The system of claim 14, in which the distillation unit comprises:
- an atmospheric distillation unit operable to separate the hydrocarbon feed into at least the naphtha stream and an atmospheric residue; and
- a vacuum distillation unit disposed downstream of the atmospheric distillation unit and operable to separate the atmospheric residue into one or more vacuum gas oil effluents and a vacuum residue,
- where the residue is the vacuum residue from the vacuum distillation unit.

19. The system of claim 14, where the distillation unit is operable to separate the hydrocarbon feed into the naphtha stream, a diesel stream, and the residue, and the system further comprises a diesel hydrotreating unit downstream of the distillation unit and operable to contact at least a portion of the diesel stream with hydrogen in the presence of at least one hydrotreating catalyst to produce a reduced sulfur diesel having a sulfur content less than the diesel stream.

20. The system of claim 19, further comprising an aromatic bottoms DHT transfer line operable to transfer at least another portion of the aromatic bottoms stream to the diesel hydrotreating unit or to a diesel stream upstream of the diesel hydrotreating unit.

* * * * *